United States Patent
Parle et al.

(10) Patent No.: US 12,020,035 B2
(45) Date of Patent: Jun. 25, 2024

(54) PROGRAMMATICALLY CONTROLLED DATA MULTICASTING ACROSS MULTIPLE COMPUTE ENGINES

(71) Applicant: NVIDIA Corporation, Santa Clara, CA (US)

(72) Inventors: Apoorv Parle, Santa Clara, CA (US); Ronny Krashinsky, Santa Clara, CA (US); John Edmondson, Santa Clara, CA (US); Jack Choquette, Santa Clara, CA (US); Shirish Gadre, Santa Clara, CA (US); Steve Heinrich, Santa Clara, CA (US); Manan Patel, Santa Clara, CA (US); Prakash Bangalore Prabhakar, Jr., Santa Clara, CA (US); Ravi Manyam, Santa Clara, CA (US); Wish Gandhi, Santa Clara, CA (US); Lacky Shah, Santa Clara, CA (US); Alexander L. Minkin, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 85 days.

(21) Appl. No.: 17/691,288

(22) Filed: Mar. 10, 2022

(65) Prior Publication Data
US 2023/0289190 A1    Sep. 14, 2023

(51) Int. Cl.
*G06F 5/06* (2006.01)
*G06F 9/38* (2018.01)
*G06F 9/48* (2006.01)
*G06F 9/52* (2006.01)
*G06F 13/16* (2006.01)
*G06F 13/40* (2006.01)
(Continued)

(52) U.S. Cl.
CPC ............ *G06F 9/3887* (2013.01); *G06F 9/522* (2013.01); *G06F 13/1689* (2013.01); *G06F 13/4022* (2013.01); *G06T 1/20* (2013.01); *G06T 1/60* (2013.01); *H04L 49/101* (2013.01)

(58) Field of Classification Search
None
See application file for complete search history.

(56) References Cited

U.S. PATENT DOCUMENTS 7,506,134 B1    3/2009  Juffa
7,788,468 B1    8/2010  Nickolls
(Continued)

OTHER PUBLICATIONS

Lindholm et al, "NVIDIA Tesla: A Unified Graphics and Computing Architecture," IEEE Micro, (2008).
(Continued)

*Primary Examiner* — Hyun Nam
(74) *Attorney, Agent, or Firm* — Nixon & Vanderhye, PC

(57) ABSTRACT

This specification describes a programmatic multicast technique enabling one thread (for example, in a cooperative group array (CGA) on a GPU) to request data on behalf of one or more other threads (for example, executing on respective processor cores of the GPU). The multicast is supported by tracking circuitry that interfaces between multicast requests received from processor cores and the available memory. The multicast is designed to reduce cache (for example, layer 2 cache) bandwidth utilization enabling strong scaling and smaller tile sizes.

21 Claims, 20 Drawing Sheets

(51) Int. Cl.
*G06T 1/20* (2006.01)
*G06T 1/60* (2006.01)
*H04L 49/101* (2022.01)

(56) References Cited

U.S. PATENT DOCUMENTS

| | | | |
|---|---|---|---|
| 7,836,118 B1 | 11/2010 | Juffa | |
| 8,112,614 B2 | 2/2012 | Nickolls | |
| 8,910,171 B2* | 12/2014 | Mital | G06F 9/3885 |
| | | | 718/107 |
| 9,639,466 B2 | 5/2017 | Robertson | |
| 10,909,033 B1 | 2/2021 | Fang | |
| 11,080,051 B2 | 8/2021 | Kerr | |
| 2002/0161908 A1* | 10/2002 | Benitez | H04L 67/5682 |
| | | | 709/236 |
| 2003/0004882 A1* | 1/2003 | Holler | G06F 16/172 |
| | | | 705/51 |
| 2003/0009538 A1* | 1/2003 | Shah | H04L 63/083 |
| | | | 709/219 |
| 2013/0024867 A1* | 1/2013 | Glew | G06F 9/5011 |
| | | | 718/104 |
| 2013/0081043 A1* | 3/2013 | Glew | G06F 9/3836 |
| | | | 718/104 |
| 2017/0149890 A1* | 5/2017 | Shamis | H04L 67/1097 |
| 2019/0370131 A1* | 12/2019 | Mishra | H04L 43/10 |
| 2022/0030473 A1* | 1/2022 | Zhang | H04W 12/106 |
| 2022/0100664 A1* | 3/2022 | Ahmad | G06F 12/0862 |
| 2023/0216947 A1* | 7/2023 | Bernardi | H04M 1/72445 |
| | | | 713/150 |
| 2023/0236878 A1* | 7/2023 | Choquette | G06F 9/4881 |
| | | | 718/106 |
| 2023/0288471 A1 | 9/2023 | Duluk | |
| 2023/0289189 A1 | 9/2023 | Bangalore Prabhakar | |
| 2023/0289190 A1* | 9/2023 | Parle | G06F 9/522 |
| 2023/0289211 A1 | 9/2023 | Hirota | |
| 2023/0289212 A1 | 9/2023 | Duluk | |
| 2023/0289215 A1 | 9/2023 | Palmer | |
| 2023/0289242 A1 | 9/2023 | Guo | |
| 2023/0289292 A1 | 9/2023 | Minkin | |
| 2023/0289304 A1 | 9/2023 | Minkin | |
| 2023/0289398 A1 | 9/2023 | Choquette | |
| 2023/0315655 A1 | 10/2023 | Choquette | |

OTHER PUBLICATIONS

Choquette et al, "Volta: Performance and Programmability", IEEE Micro (vol. 38, Issue: 2, Mar./Apr. 2018), DOI: 10.1109/MM.2018.022071134.

* cited by examiner

|       | B1    | B2    | B3    | B4    |
|-------|-------|-------|-------|-------|
| A1    | A1*B1 | A1*B2 | A1*B3 | A1*B4 |
| A2    | A2*B1 | A2*B2 | A2*B3 | A2*B4 |
| A3    | A3*B1 | A3*B2 | A3*B3 | A3*B4 |
| A4    | A4*B1 | A4*B2 | A4*B3 | A4*B4 |

FIG. 1E

Example General Processing Cluster

PROGRAMMATICALLY CONTROLLED DATA MULTICASTING ACROSS MULTIPLE COMPUTE ENGINES

CROSS-REFERENCES TO RELATED APPLICATIONS

This application is related to the following commonly-assigned copending US patent applications, the entire contents of each of which are incorporated by reference:
U.S. application Ser. No. 17/691,276 filed Mar. 10, 2022, titled "Method And Apparatus For Efficient Access To Multidimensional Data Structures And/Or Other Large Data Blocks";
U.S. application Ser. No. 17/691,621 filed Mar. 10, 2022, titled "Cooperative Group Arrays";
U.S. application Ser. No. 17/691,690 filed Mar. 10, 2022, titled "Distributed Shared Memory";
U.S. application Ser. No. 17/691,759 filed Mar. 10, 2022, titled "Virtualizing Hardware Processing Resources in a Processor";
U.S. application Ser. No. 17/691,296 filed Mar. 10, 2022, titled "Hardware Accelerated Synchronization With Asynchronous Transaction Support";
U.S. application Ser. No. 17/691,303 filed Mar. 10, 2022, titled "Fast Data Synchronization In Processors And Memory";
U.S. application Ser. No. 17/691,406 filed Mar. 10, 2022, titled "Efficient Matrix Multiply and Add with a Group of Warps";
U.S. application Ser. No. 17/691,872 filed Mar. 10, 2022, titled "Techniques for Scalable Load Balancing of Thread Groups in a Processor";
U.S. application Ser. No. 17/691,808 filed Mar. 10, 2022, titled "Flexible Migration of Executing Software Between Processing Components Without Need For Hardware Reset"; and
U.S. application Ser. No. 17/691,422 filed Mar. 10, 2022, titled "Method And Apparatus For Efficient Access To Multidimensional Data Structures And/Or Other Large Data Blocks".

FIELD

This technology generally relates to improving processing efficiency of processors. More particularly, the technology herein relates to specialized circuitry for handling multicast.

BACKGROUND

Users want deep learning and high performance computing (HPC) compute programs to continue to scale as graphics processing unit (GPU) technology improves and the number of processing core units increases per chip with each generation. What is desired is a faster time to solution for a single application, not scaling only by running N independent applications.

FIG. 1A shows example deep learning (DL) networks comprising long chains of sequentially-dependent compute-intensive layers. Each layer is calculated using operations such as e.g., multiplying input activations against a matrix of weights to produce output activations. The layers are typically parallelized across a GPU or cluster of GPUs by dividing the work into output activation tiles each representing the work one processing core will process.

Due to the potentially massive number of computations deep learning requires, faster is usually the goal. And it makes intuitive sense that performing many computations in parallel will speed up processing as compared to performing all those computations serially. In fact, the amount of performance benefit an application will realize by running on a given GPU implementation typically depends entirely on the extent to which it can be parallelized. But there are different approaches to parallelism.

Conceptually, to speed up a process, one might have each parallel processor perform more work (see FIG. 1B) or one might instead keep the amount of work on each parallel processor constant and add more processors (see FIG. 1C). Consider an effort to repave a highway several miles long. You as the project manager want the repaving job done in the shortest amount of time in order to minimize traffic disruption. It is obvious that the road repaving project will complete more quickly if you have several crews working in parallel on different parts of the road. But which approach will get the job done more quickly—asking each road crew to do more work, or adding more crews each doing the same amount of work? It turns out that the answer depends on the nature of the work and the resources used to support the work.

Computer scientists refer to the first approach as "weak scaling" and the second approach as "strong scaling."

Users of such applications thus typically want strong scaling, which means a single application can achieve higher performance without having to change its workload—for instance, by increasing its batch size to create more inherent parallelism. Users also expect increased speed performance when running existing (e.g., recompiled) applications on new, more capable GPU platforms offering more parallel processors. GPU development has met or even exceeded the expectations of the marketplace in terms of more parallel processors and more coordination/cooperation between increased numbers of parallel execution threads running on those parallel processors—but further performance improvements to achieve strong scaling are still needed.

BRIEF DESCRIPTION OF THE DRAWINGS

FIG. 1E shows an example of redundant memory fetches.

DETAILED DESCRIPTION OF EXAMPLE NON-LIMITING EMBODIMENTS

Embodiments of this disclosure are directed to support GPU performance improvements by "strong scaling", from L2 cache to SM bandwidth (referred to also as "L2 bandwidth") improvements, and by leveraging algorithmic redundancy of applications.

Figure 1A:
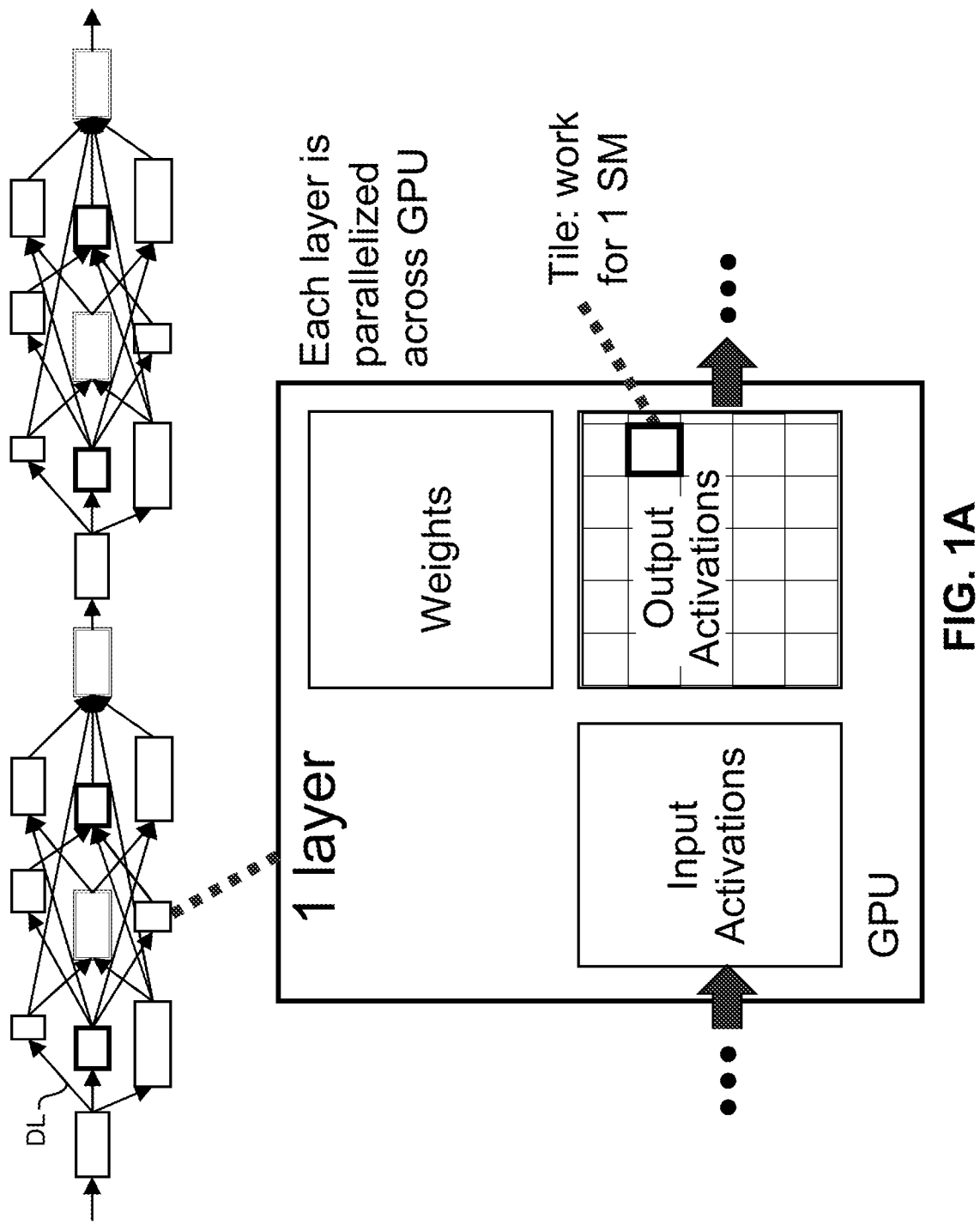
FIG. 1A shows an example application running on a GPU.
Figure 1C:
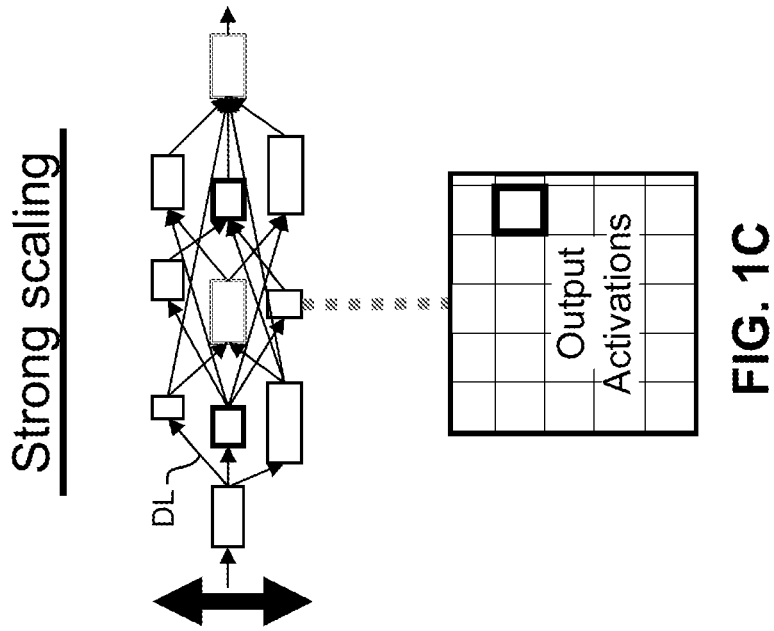
FIG. 1C shows a strong scaling deep learning scenario.
Figure 1B:
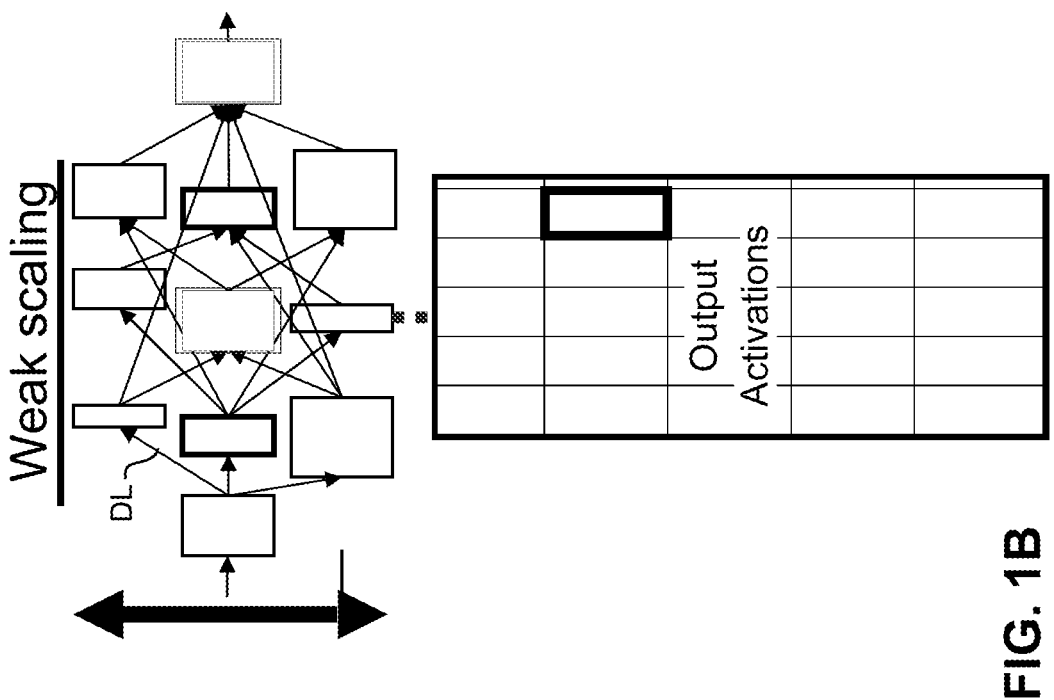
FIG. 1B shows a weak scaling deep learning scenario.

Strong scaling was described above in relation to FIG. 1A-1C, and refers to GPU design improvements such that the same amount of work (compared to a previous generation of GPU) can be performed at multiple times the speed on a faster processor. This effectively reduces the tile size allocated to each processor.

To achieve strong scaling, GPU designers prefer to have tiles that are as small as possible. However, reduced tile sizes impose higher demands on the L2 cache—streaming multiprocessor bandwidth. To achieve the higher bandwidth required by tiles of small sizes (e.g. 64×64), hardware aspects of the GPU such as, for example, one or more of the number of processors, the number of L2 cache slices (referred to as "L2 slices"), number of blocks transferred per clock cycle, and clock speed must be scaled up. However, for such hardware aspects to be scaled up, difficulties are encountered with respect to increased number of wires necessary, quadratic escalation of the crossbar costs due to the need to connect an increasing number of ports on the L2 cache and SM, the increasing of required additional random access memory (RAM) banks, and the like.

Figure 1D:
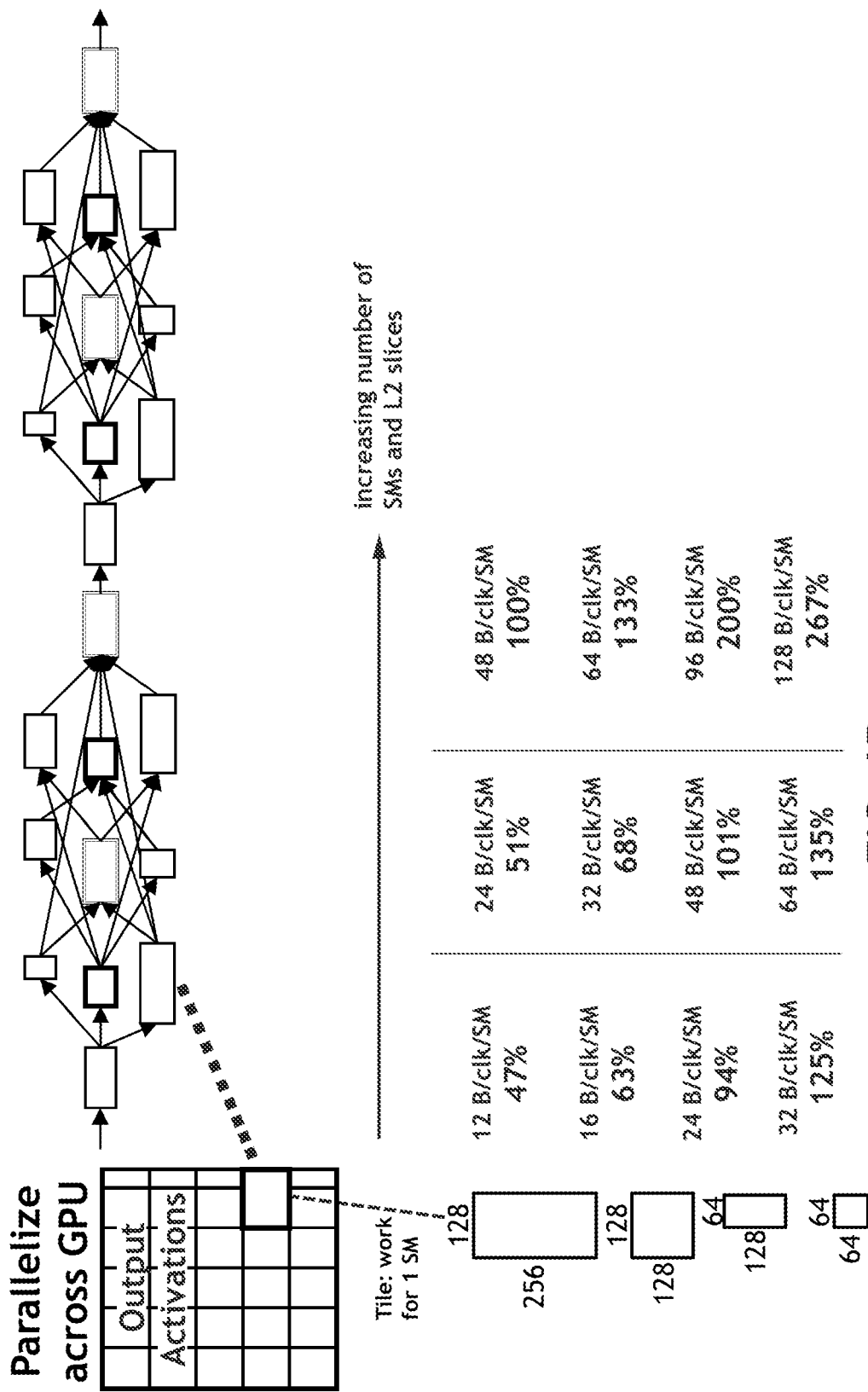
FIG. 1D shows that smaller tile sizes in strong scaling imposes high layer 2 cache bandwidth demands.

FIG. 1D illustrates the L2 bandwidth demand in three different GPUs, from left to right representing increasing numbers of processors (in this example, streaming multi-processors (SM)) and L2 slices per GPU, as the tile size is made smaller. The pattern of sharp increase in the L2 bandwidth demand in larger more powerful GPUs as the tile size is made smaller is clear in FIG. 1D.

Example embodiments of this disclosure leverage data fetch redundancy to reduce the bandwidth and power required to move the same amount of data and better scale. Example embodiments increase effective L2 bandwidth by multicast of response data from one L2 read to multiple cooperative thread arrays (CTA) on multiple SMs. In some embodiments, the CTAs receiving the multicast response all belong to the same corporative group array (CGA). Example applications that can benefit significantly from this disclosure include generic matrix multiply (GEMM) and GEMM-like kernels.

FIG. 1E shows an example Generic Matrix Multiplication (GEMM) scenario for which, conventional GPUs may lose performance due to data fetch redundancy. The illustrated GEMM results in a 4×4 result matrix representing the calculating of the multiplication of the 4×1 vector A (having elements A1-A4) with the 1×4 vector B (having elements B1-B4). Also, although the discussion related to FIG. 1E is in relation to GEMM, embodiments of this disclosure are not limited to improved performance in GEMM kernels and can yield improved performance for many other applications including applications such as, for example, convolution kernels.

As can be seen in FIG. 1E, each cell (element) of the first row of the result matrix utilizes element A1 from the input matrix A, and each cell of the first column of the result matrix utilizes element B1 from the input matrix B. In general, each cell in the result matrix utilizes some input data that is the same as in the input data of its adjacent cells. In previous NVidia GPUs, the A1 element was separately fetched from the memory (typically from the L2 cache) for calculating each element in the first row of the result matrix. Likewise, the B1 element was separately fetched for calculating each element in the first column of the result matrix. The fetching of the same element (e.g. A1, B1) several times from the L2 cache is an example data fetch redundancy that results in bandwidth (e.g. memory bandwidth, crossbar (Network on Chip—NOC) bandwidth) and power both being wasted.

Example embodiments of this disclosure leverage this data fetch redundancy to reduce the bandwidth and power required to move the same amount of data and better scale. Overview of Programmatic Multicast Some example embodiments of this disclosure provide a new programming and hardware execution model to allow coordinated data fetching by a processor on behalf of multiple processors. In some embodiments, data read from the L2 cache in one read operation travels through at least part of the crossbar network-on-chip (referred to simply as "crossbar" or "crossbar switch") as a single packet before that data, or portions thereof, is distributed to plural processors.

New packet formats and tracking structures in hardware are formed to control the multicast operation.

The crossbar includes the capability to handle multicast packet formats with fields to target multiple destinations. The crossbar also includes the capability to send the same packet to multiple destinations at one or more points of separation.

Additionally, some example embodiments include synchronization mechanisms to indicate transaction completion and/or error reporting.

Figure 2A:
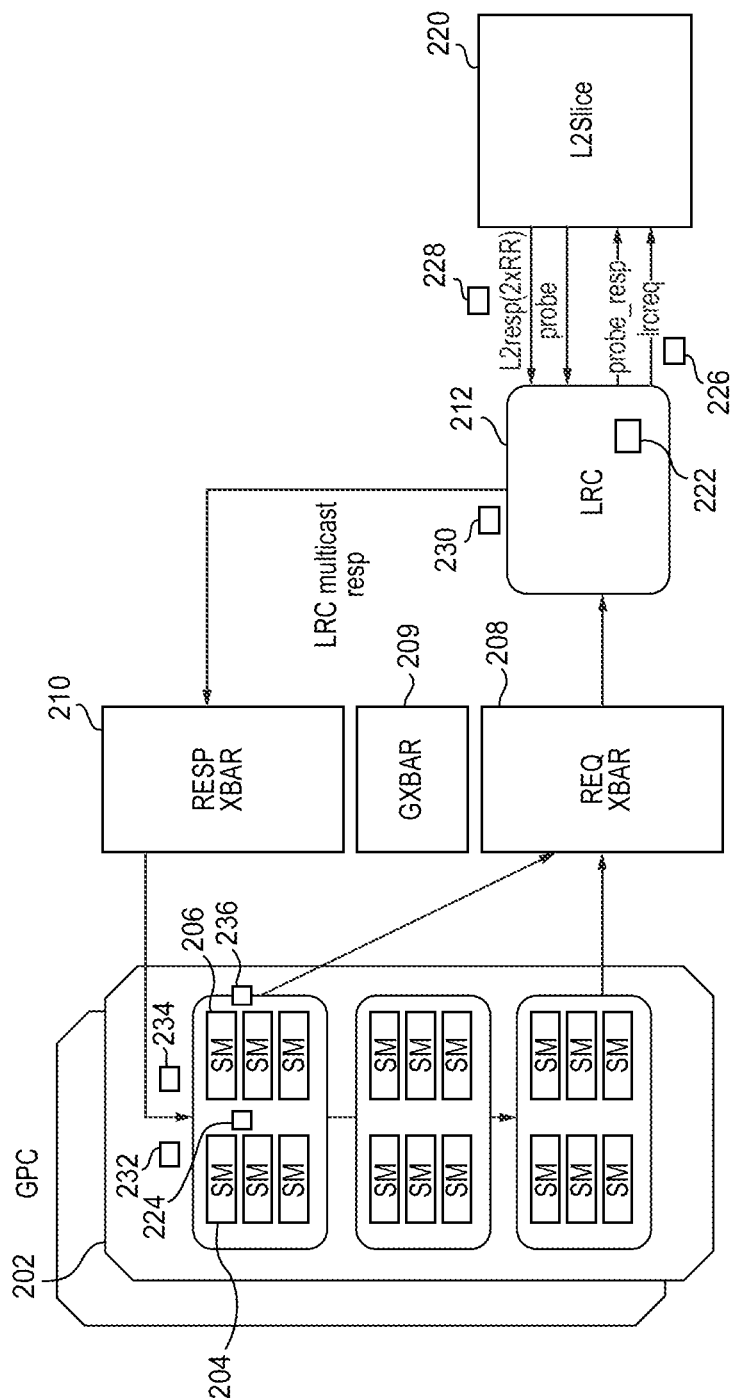
FIG. 2A shows example multicast message flow in programmatic multicast when one processor fetches data on behalf of multiple processors according to some embodiments.

FIG. 2A illustrates an overview of a multicast packet origination and corresponding packet flow in a GPU, according to some embodiments.

The GPU 200 comprises one or more GPC 202, each having a plurality of processors (e.g. 204, 206 etc.), such as, for example, SMs. A kernel is launched as a cooperative group array (CGA) of threads, with a respective cooperative thread array (CTA) of threads being run on each of the shown SMs, including on SMs 204 and 206. In this example, SM 204 generates a multicast request packet 224. More specifically, a thread in the CTA executing on SM 204 generates the multicast request packet 224. The SM 204 may be referred to as the "multicast source SM" or "multicast requesting SM" because the thread that generates the multicast request packet is on SM 204.

The thread that generates the multicast request packet 224, may be referred to as the "leader thread" in a thread block that comprises the leader thread and in which all other threads are follower threads. The leader thread includes instructions to generate and transmit the multicast request packet 224 requesting data on behalf of threads on multiple SMs, such as, for example, SM 204 and SM 206. In some embodiments, the leader thread may make a multicast request packet 224 to request data on behalf of at least one thread executing on at least one SM other than the multicast source SM. All threads for whose benefit the leader thread requests data may be referred to as "follower threads" regardless of whether they are on the same SM as the leader thread.

The formats and parameters of the multicast packet are described below. As described in more detail below, the multicast request packet 224 identifies the multiple receiver SMs or CTAs for the requested data. The requesting SM is not required to be one of the receiver SMs. That is, the requesting SM may request data entirely on behalf of other SMs.

The multicast request packet 224 is transmitted on the request crossbar 208 to the L2 Request Coalescer (LRC) 212.

At the LRC 212, multicast-specific information that was included in the multicast request packet 224 is saved in a tracking structure 222, and an L2 request packet 226 is generated. The L2 request packet 226 comprises the request for data to be sent to the L2 cache, but may not include the multiple multicast receiver identifiers that were in packet 224. The L2 request packet 226 may not include any multicast-specific information, and is handled by the L2 cache in a same or similar manner as handling a quest for data for one SM or CTA.

An L2 slice 220, of the L2 cache comprising a plurality of L2 slices, which includes the requested data receives the L2 request packet 226, and returns a L2 response packet 228 with the requested data. The response packet 228 may not include any multicast-specific information and may be considered a unicast packet.

At LRC 212, the L2 response packet 228 is matched to the tracking structure 222 of saved tracking information. The matching may be performed based on one or more parameters that are included in both the L2 request packet 226 and the L2 response packet 228 and that can uniquely identify pending L2 requests. An LRC multicast response packet 230 that comprises the requested data received from the L2s slice 220 and information regarding the multiple receivers for the requested data is generated. The information regarding the multiple receivers is obtained from the saved tracking information in tracking structure 222. When the multicast request is issued by the leader thread to request data on behalf of at least one thread executing on at least one SM other than the multicast source SM, the LRC multicast response packet comprises the requested data and information regarding the receiver SM.

The LRC multicast response packet 230 travels through the response crossbar 210 as a single packet through the crossbar path that is common to all receivers designated in the packet 230. The result data in the single packet 230 is duplicated into two or more packets as determined to be necessary based upon the list of receivers at one or more points of separation. In the illustrated example, the result data carried in packet 230 is duplicated to two packets 232 and 234 for receiving SMs 204 and 206 as identified in the list of receivers, respectively, at a separation point which is a point in the crossbar at which the common path from an input port to the receiver crossbar 210 separates to a first path to SM 204 and a second path to SM 206. The separation point could be earlier if the receiver SMs are not in the same texture processing cluster (TPC).

Each of the one or more receivers of multicast result data sends an ack message to the requester of the multicast data. In the illustrated example, the multicast result data is received by SMs 204 and 206. SM 204 is also the requester of the multicast data and therefore does not generate an acknowledgment for the received result data. SM 206, which is not the requester, generates an acknowledgment packet 236 to requester SM 204.

The acknowledgment packet 236 travels through the request crossbar 208, interconnect crossbar 209 and response crossbar 210, and is received by SM 204. As described in more detail below, a synchronization technique may be utilized by the sender SM 204 and receiver SMs in order to detect completion of the transaction or an errored transaction. In some embodiments, the acknowledgment packet is used to detection completion of the transaction of an errored transaction.

Figure 2B:
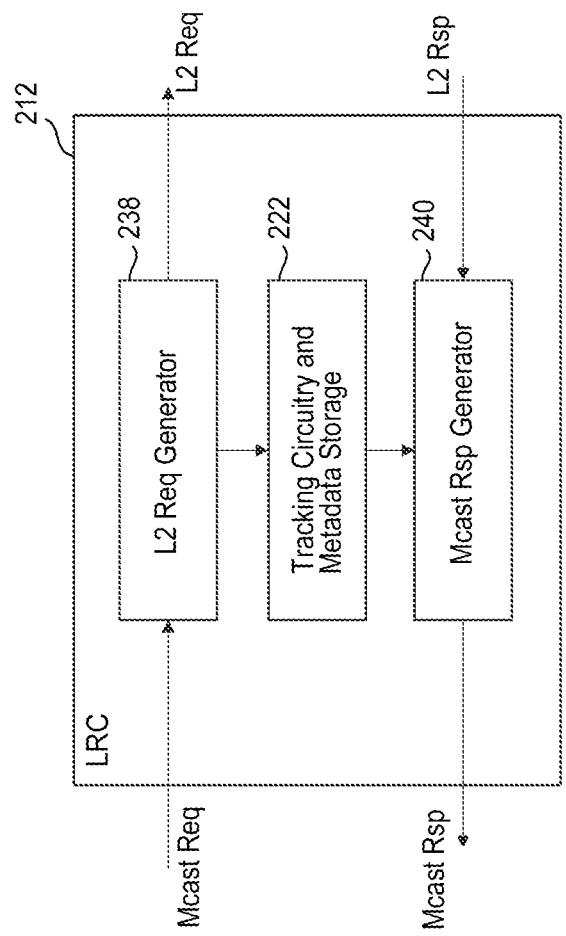
FIG. 2B shows a block diagram of an L2 Request Coalescer (LRC) that services a multicast message flow in accordance with some embodiments.

FIG. 2B is a block diagram of components of LRC 212 that are primarily involved in the multicast packet processing. The L2 request generator 238 is configured to receive the multicast request packet and, based on the received multicast packet for data, generate the L2 request packet for the data. The L2 request generator 228 additionally saves multicast-specific information included in the multicast request packet, such as the multicast receivers, in tracking circuitry and metadata storage 222.

The multicast response generator 240 receives the L2 response packet from the L2 slice with the requested data, and generates the LRC multicast response packet including the requested data received from the L2 slice. The multicast response generator 240 matches the L2 response packet to the stored metadata in order to obtain the associated list of multicast receivers and includes that information in the multicast response packet.

Multicast In A Cooperative Group Array

Figure 3:
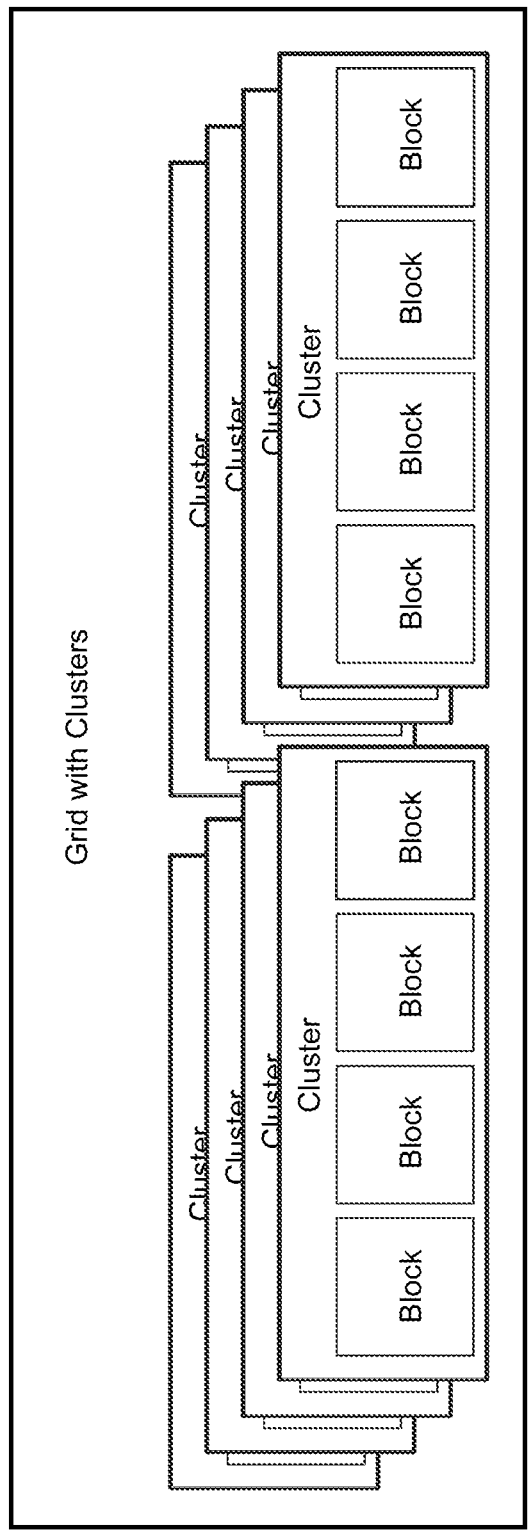
FIG. 3 shows a conceptual view of the cooperative group array (CGA) of threads.

FIG. 3 illustrates an arrangement of blocks of threads in a Cooperative Group Array (CGA), according to some embodiments. A CGA is a new programming/execution model and supporting hardware implementation and is described in U.S. patent application Ser. No. 17/691,621, which is herein incorporated by reference in its entirety. In some embodiments, the multicast technology described in this disclosure is built on the CGA programming/execution model. The CGA programming/execution model enables adjacent tiles to be launched into SMs on the same GPC.

In one embodiment, a CGA is a collection of CTAs where hardware guarantees that all CTAs of the CGA are launched to the same hardware organization level the CGA specifies or is associated with. The hardware is configured to make sure there are enough processing resources in the target hardware level to launch all CTAs of the CGA before launching any.

As FIG. 3 shows, a CGA is a grid of clusters of thread blocks or CTAs organized as an array. Such CGAs provide co-scheduling, e.g., control over where clusters of CTAs are placed/executed in the GPU, relative to the memory required by an application and relative to each other. This enables applications to see more data locality, reduced latency, and better synchronization between all the threads in tightly cooperating clusters of CTAs.

For example, CGAs let an application take advantage of the hierarchical nature of the interconnect and caching subsystem in modern GPUs and make it easier to scale as chips grow in the future. By exploiting spatial locality, CGAs allow more efficient communication and lower latency data movement. GPU hardware improvements guarantee that threads of plural CTAs in the new CGA hierarchical level(s) defined will run concurrently for desired spatial localities, by allowing CGAs to control where on the machine the concurrent CTA threads will run relative to one another.

In one embodiment, CGAs are composed of clusters of CTAs that are guaranteed by hardware to launch and execute simultaneously/concurrently. The CTAs in a CGA cluster may—and in the general case will—execute on different SMs within the GPU. Even though the CTAs execute on different SMs, the GPU hardware/system nevertheless provides a cross-SM guarantee that the CTAs in a CGA cluster will be scheduled to execute concurrently. The GPU hardware/system also provides efficient mechanisms by which the concurrently-executing CTAs can communicate with one another. This allows an application to explicitly share data between the CTAs in a CGA cluster and also enables synchronization between the various threads of the CTAs in the CGA cluster.

In example embodiments, the various threads within the CGA cluster can read/write from common shared memory—enabling any thread in the CGA cluster to share data with any other thread in the cluster. Sharing data between CTAs in the CGA cluster saves interconnect and memory bandwidth which is often the performance limiter for an application.

Now, using the concurrent execution and additional shared memory supported by hardware, it is possible to directly share data between threads of one CTA and threads of another CTA—enabling dependencies across CTAs that can bridge hardware (e.g., cross-SM) partitions.

Because CGAs guarantee all their CTAs execute concurrently with a known spatial relationship, other hardware optimizations are possible such as: Multicasting data returned from memory to multiple SMs (CTAs) to save interconnect bandwidth as in embodiments of this disclosure; Direct SM-to-SM communication for lower latency data sharing and improved synchronization between producer and consumer threads in the CGA; Hardware barriers for synchronizing execution across all (or any) threads in a CGA; and more (see copending commonly-assigned patent applications listed above).

The additional cluster overlay provided by the CGA defines where and when the CTAs will run, and in particular, guarantees that all CTAs of a CGA will run concurrently within a common hardware domain that provides dynamic sharing of data, messaging and synchronization between the CTAs.

Example embodiments support different types/levels of CGAs directed to different GPU hardware domains, partitions or other organization levels. Specifically, a CGA cluster can define or specify the hardware domain on which all CTAs in the cluster shall run. In example embodiments, the hierarchies or clustering the CGAs define/specify, are tied to or otherwise reflect GPU hardware partitions reflective of memory access and/or communications capabilities, in order to provide desired resource and data re-use and data locality.

Figure 4:
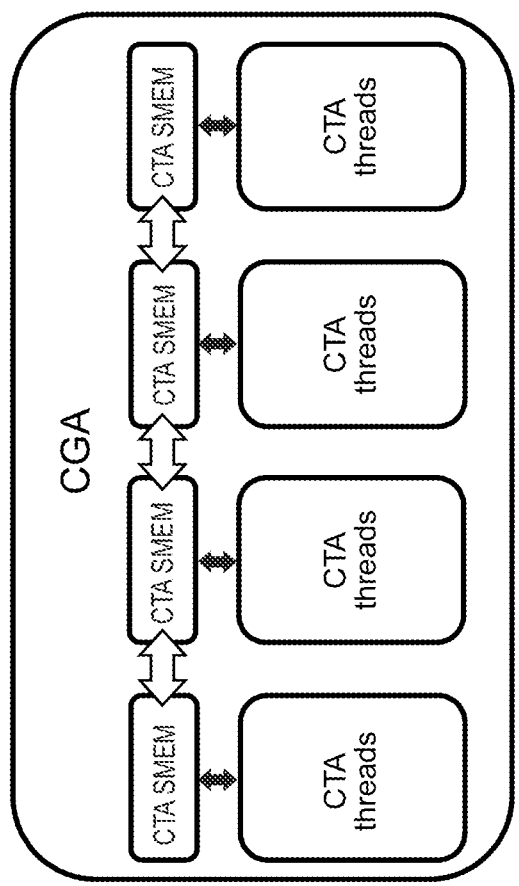
FIG. 4 shows conceptual view of shared memory organization for a cooperative thread array (CTA).

FIG. 4 illustrates example CGA scenarios in which a CGA cluster executes on any number of (in this case four or more) SMs. In example embodiments, all CTA threads within a CGA may reference various types of commonly-accessible shared memory. Hardware support in the GPU allows the different CTAs in a CGA cluster to read and write each other's shared memory. Thus, load, store and atomic memory accesses by a first CTA can target shared memory of a second CTA, where the first and second CTAs are within the same CGA cluster.

In example embodiments, the CTAs in a GPC_CGA (i.e. all CTAs of the CGA are in the same GPC) may allocate memory from a common data pool in global memory. In some embodiments, this data pool is completely under software control with certain strategic hardware support (e.g., memory slot allocation with throttling). The pool can be sized so that memory requested by all the executing GPC_CGAs always fits in near memory such as an L2 cache for decreased latency, or it can be sized to provide much larger shared memory structure than could ever fit in an L1 or L2 cache. Such a common "CGA linear shared memory" data pool may be used for data that has no additional hierarchy or does not fit in other types of CGA shared memory. Such CGA linear shared memory is allocated to a CGA and is equally accessible by all threads of the CTAs in the CGA's cluster to provide uniform access shared memory, thereby simplifying the programming model.

Figure 5:
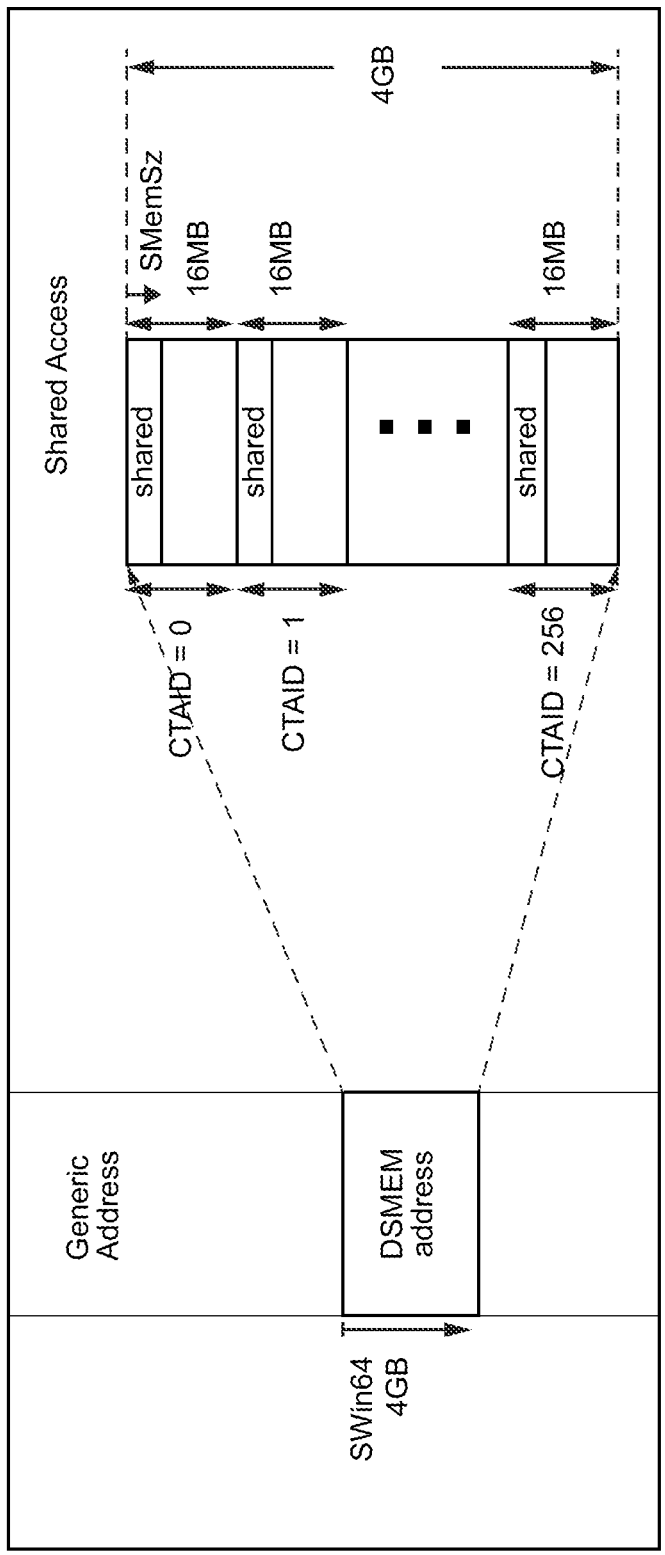
FIG. 5 shows an example arrangement of the respective shared memory of each CTA.

FIG. 5 shows an example circuit arrangement for allocating and deallocating linear memory slots of a linear shared memory pool to/from CGAs. In a CGA, each SM can access each of the other SMs memory. In some embodiments, the source multicast SM writes to the receiver multicast SMs in their respective memories using the distributed memory mechanism described with respect to FIG. 5. Load, store, atomic operations can target other CTA's shared memory. An example distributed memory that may be used in embodiments is described in U.S. application Ser. No. 17/691,690, which is incorporated herein by reference in its entirety. In some example embodiments, the distributed shared memory of the respective SMs is mapped into generic address space.

An example linear shared global memory implementation is based on having a global CGA_linear_memory slot index which is allocated and recycled by hardware. See FIG. 5. Most of the memory management may then be done by software based on the unique CGA_linear_memory slot supplied to each running CGA that requires CGA linear shared global memory. The linear shared global memory may be regular global memory that can be cached in the L2 cache and backed by physical addresses in DRAM such that no special logic is required in the memory management unit (MMU) or the L2 cache.

In one example embodiment, the hardware provides a unique global CGA linear memory slot index per GPC-sized CGA identifying which of the buffers in the pool the CGA is using, and uses this slot index to prevent CGA launch until a memory slot is available in the range the grid specifies. In such implementations, the hardware-provided CGA_linear_memory slot index is unique across all running CGAs. This allows different grids from different virtual engines (which may compete for resources) to run on the hardware at the same time.

Figure 6:
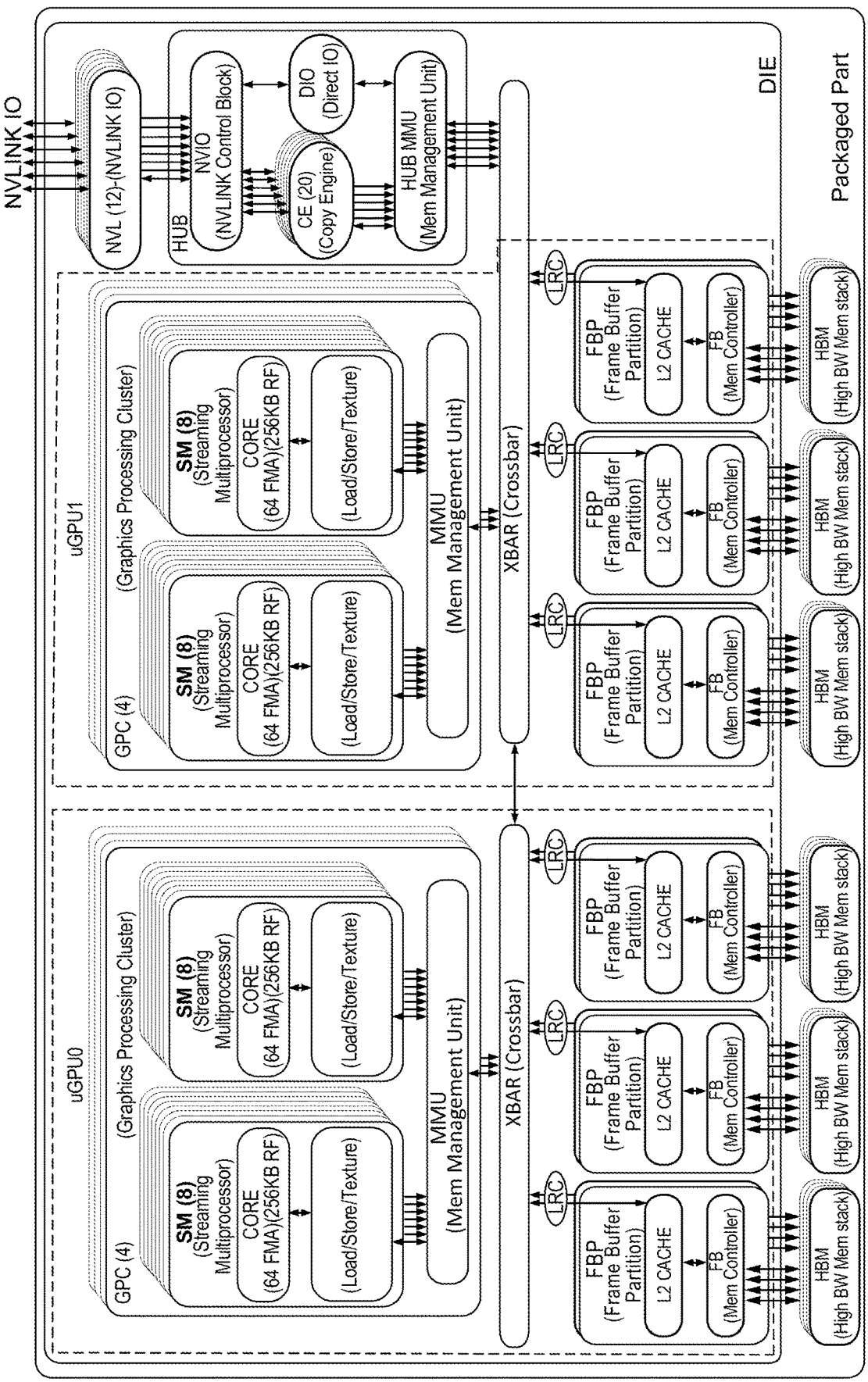
FIG. 6 is a block architectural diagram of a GPU architecture including processors (e.g., streaming multiprocessors) and associated interconnects partitioned into different μGPC partitions and including an LRC such as that shown in FIG. 2B.

FIG. 6 shows how some example GPU implementations may enable plural partitions that operate as micro GPUs such as μGPU0 and μGPU1, where each micro GPU includes a portion of the processing resources of the overall GPU. When the GPU is partitioned into two or more separate smaller μGPUs for access by different clients, resources—including the physical memory devices such as local L2 cache memories—are also typically partitioned. For example, in one design, a first half of the physical memory devices coupled to μGPU0 may correspond to a first set of memory partition locations and a second half of the physical memory devices coupled to μGPU1 may correspond to a second set of memory partition locations. Performance resources within the GPU are also partitioned according to the two or more separate smaller processor partitions. The resources may include level two cache (L2) resources and processing resources. One embodiment of such a Multi-Instance GPU ("MIG") feature allows the GPU to be securely partitioned into many separate GPU Instances for CUDA ("Compute Unified Device Architecture") applications, providing multiple users with separate GPU resources to accelerate their respective applications. More particularly, each micro GPU includes a plurality of GPCs each with a plurality of SMs. Each GPC connects to the L2 cache via a crossbar and per L2 slice LRC.

For more information on prior GPU hardware and how it has advanced, see for example U.S. Pat. Nos. 8,112,614; 7,506,134; 7,836,118; 7,788,468; U.S. Ser. No. 10/909,033; US20140122809; Lindholm et al, "NVIDIA Tesla: A Unified Graphics and Computing Architecture," IEEE Micro (2008); https://docs.nvidia.com/cuda/parallel-thread-execution/index.html (retrieved 2021); Choquette et al, "Volta: Performance and Programmability", IEEE Micro (Volume: 38, Issue: 2, March/April 2018), DOI: 10.1109/MM.2018.022071134.

Programmatic Multicast Operations

Programmatic multicast is a new form of memory request. This request first reads global memory, and then it delivers the data that was read to multiple target CTAs (possibly including the same CTA that initiated/executed the request) as specified in the instruction. The data is read from L2 once, returned to the LRC, and then multicast to all the target CTAs simultaneously on the response crossbar. Although in preferred embodiments the multicast packets are generated in parallel, in some embodiments, at least some of the multicast packets may be generated serially.

In some embodiments, a new load operation is provided. Although in typical memory access requests where an SM requests data and itself receives the requested data, and can therefore itself keep any information it needs to preserve regarding the handling of that data when it is received, the multicast operation of this disclosure requires that the information, referred to herein as "metadata", necessary for handling the received data travels with the multicast request packet. Because the multicast requester and the multicast receiver may not be the same, the receivers need to also receive the metadata from the requester. The requester need not keep the metadata upon transmitting the request, and instead it travels with the multicast packet itself through the multicast path.

Multicast Request Format

Key attributes of the new load operation include the global memory address to read from (e.g. source data address), destination (receiver) CTAs/SMs, destination shared memory address, and the synchronization entity. The destination CTAs/SMs can be specified as a bit vector or as another data structure such as a list. The destination shared memory address (e.g., destination data address) can be an offset that is symmetric across destination CTAs. That is, the offset may be the same for all destination CTAs. The synchronization entity may be represented by a barrier ID to indicate completion. The synchronization entity, which may be specified as an offset, can be symmetric across all CTAs of the CGA.

In some embodiments, the new load operation is built on top of CGA programming/execution module to leverage its launch, synchronization and distributed memory features. In some embodiments, the new load operation utilizes underlying memory access services provided by a tensor memory access unit (TMA). The TMA is described in U.S. application Ser. No. 17/691,276 and U.S. application Ser. No. 17/691,422, which are hereby incorporated by reference in their entirety. In some embodiments, the load operation may be extended to non-TMA instructions like the LDGSTS (Asynchronous Global to Shared Memcopy) instruction described in U.S. patent application Ser. No. 16/712,083.

In an example embodiment, a multicast load instruction implemented on TMA may have a format such as the following:

UTMALDG.dim{.IM2COL}{.MULTICAST} [URb], [URa], URc . . . ; .dim: {0.1D, 0.2D, 0.3D, 0.4D, 0.5D}—Tensor dimensionality .IM2COL: Enables image-to-column load mode. The image-to-column mode support of the TMA is described in the U.S. application Ser. No. 17/691,276 which was incorporated above.

URb: Source B uniform register. Packed destination address, shared memory barrier address and tensor coordinates.

{URb, URb+1} specifies the destination data/barrier distributed shared memory address as follows:

```
+---------------URb+1--------------+--------------URb-------------+
63 56 55 32 31 24 23 0
+-----------------+--------------+----------------+--------------+
| CTA_ID - Barrier | BarrierOffset | CTA_ID - Data | DataOffset |
+-----------------+--------------+----------------+--------------+
```

URa: Source A uniform register. Specifies the global memory address of the tensor descriptor.

.MULTICAST: Enables multicast mode.

URc: Source C uniform register. Multicast CTA ids (or SM ids), and optionally also one or more (e.g., up to three) tensor coordinate offsets for .IM2COL.

In some embodiments, the CTA ID mask may be encoded in the following format:

```
31 16 15 0
+----------------------+---------------+
| Multicast CTA_ID mask | im2col offsets|
+----------------------+---------------+
```

In some embodiments, all CTAs in the CGA may be multicast destinations. However, in some embodiments up to 16 destination CTA IDs are encoded in a 16-bit mask included in URc, where each bit corresponds to a CTA ID. In some embodiments, although a CGA may have up to 32 CTAs only the first 16 CTAs from [0:15] range may be able participate in the multicast mode.

Destination SMs may not have metadata that describe how the received data is to be processed (e.g., such as, received data should be written in image-to-column format, etc.), unlike source SMs. Therefore, all metadata necessary to handle the responses must be sent with the packet. "Metadata" transported from source SM to destination SMs may include, for example:

SM ID mask corresponding to the destination SMs (CTA IDs),
CGA ID,
Data SMEM (shared memory) Offset,
Barrier address Offset,
Source SM ID for responses,
ACK phase ID (two possible phases, part of the MEMBAR protocol), and
implementation specific result data processing parameters.

The SM ID mask may be a bitmask that identified each of the destination (receiver) SMs. The source SM may generate the SM IDs from the corresponding CTA IDs included in an instruction by mapping from CTA ID to SM ID based on a mapping table. The CGA ID is used by the receiver to identify the CGA to which the requesting thread(s) belong. In implementations where one CGA has only one CTA in an SM, the CGA ID may be used to represent the CTA too. The shared memory offset represents the offset, from the shared memory base address for the SM, at which the result data should be written. The barrier address offset can be used by the receiver to identify the barrier.

The source SM ID is used by the receiving SM to send an acknowledgment of the received data. The Ack Phase ID field is used by the receiving SM to correctly indicate the phase of the MEMBAR synchronization protocol to which an ack corresponds.

Other parameters such as various implementation-specific parameters may also be included in the metadata. For example, in some embodiments, in a TMA-based implementation, TMA-specific parameters for processing result data by swizzling (rearranging the result data upon writing in accordance with the source tensor attributes), z-filling (filling out-of-bounds memory locations with a predetermined value) etc. may be included in the metadata to travel with the request packet and to be included in the result packet that reaches the receiving SM.

Multicast Response

The response data (requested data) included in the multicast response packet is ultimately received at each of the receiving SMs. According to some embodiments, each SM maintains a table mapping {CGA-ID, CTA-ID-in-CGA} to {SMEM Base Address}. For each response received at an SM, the above mapping table is looked up to obtain the shared memory base address corresponding to the receiving CTA identified in the response packet. The requested data, or the corresponding portion thereof, is written to SMEM data RAM at {SMEM Base Address, SMEM Offset}. The offset information is included in the received response packet. It should be noted that certain implementation specific processing and/or organization (e.g., swizzle and z-fill operations discussed above) of the response data may be performed before or while the result data is written to shared memory.

Additionally, according to some embodiments, the receiving process also increments an arrive count corresponding to the barrier address {SMEM Base Address, Barrier ID Offset in Packet}. The arrive count is incremented by the number of bytes received by the destination SM. After the arrive count is incremented, an Ack is generated by the destination SM and sent to the source SM ID (the source SM ID information may be included in the received response packet) to signal completion of the operation at the destination SM. The destination SM may not be required to wait for the ack to reach the source SM.

Completion/Error Handling

The multicast sender SM keeps track of all outstanding transactions in counters. In example embodiments, there are 2 types (sync, async) of outstanding transactions and 2 phases per type that are tracked.

Programmatic multicast loads described in this disclosure are "async" type of transactions, while direct distributed shared memory writes to other SMs (such as that described in U.S. application Ser. No. 17/691,690) are of the "sync" type. Each receiver SM is expected to send an ack count for each data packet.

Multiple acks can be combined as a count for better performance. For this purpose, each receiver SM tracks counts per source-SM and sends an ack only when the count is large enough and the bus is idle.

In case of errors, a NACK is sent instead. The errors may include out of range errors, CTA already exited, specified offset or barrier is out of range, etc.

The ack/nack generation is useful to ensure no transactions are in-flight before context switching, CGA exiting or trap handling.

The sender SM keeps track of total outstanding requests, not per receiver SM. It has separate counters for sync, async and the two phases for each type. But the receiver SM does track total Acks owed to other SMs with a counter per other SM. The sender SM does not keep counts per receiver SM, and only tracks the total number of bytes requested. Thus the sender keeps one counter each for the sync, async types and each of the two phases. In contrast, each receiver SM has a set of counters for each potential source SM.

Synchronization

Synchronization has two aspects in some embodiments: "data ready for use" and MEMBAR.

In "data ready for use" synchronization in regular operation, one or more barriers in an arrangement such as the SYNCS unit may be updated based on multicast response data being received by the respective receivers. The SYNCS unit is described in U.S. application Ser. No. 17/691,296, which is herein incorporated in its entirety by reference. Barrier use, such as in the SYNCS unit, may be the primary means of synchronization for regular operation. In the programming model for the barriers, the source SM issues a load for a defined number of bytes, and the receiving SMs each wait on a barrier for that number of bytes to be received. The load instruction may specify the barrier address (e.g. as a shared memory offset).

Each data response updates the transactions that have occurred. The transaction counts are in bytes of data. The expected transactions or bytes are programmed into the barrier as well. The expected transactions can be programmed by the sender or the receiver and that can be done before, during, or after the data is returned. The barrier clears when all the data has been received and all the barrier ARRIVEs needed to program expected transactions count (in bytes) into the barrier have been completed. Any thread waiting on the barrier can start using the data when its arrive count is met.

The MEMBAR operation is used to ensure that the operations preceding the MEMBAR have already completed or that they are visible to all operations that follow the MEMBAR.

Programmatic multicast loads are "asynchronous" operations. The MEMBAR.CTA or MEMBAR.GPU do not wait for completion of these operations. MEMBAR.ASYNC can be used explicitly, to ensure visibility of all operations to all CGA threads. When a MEMBAR.ASYNC is generated the current operating phase flips and the next phase begins. If the MEMBAR waits for all Acks corresponding to current phase to be received and the MEMBER will not clear until such condition, the next phase is used to handle subsequent multicast operations. ACK counters are used to track outstanding operations before MEMBAR.ASYNC is cleared.

Phases are used to issue new multicast operations while waiting for previous operations to complete.

Example Multicast Packet Transport Hardware

Figure 7:
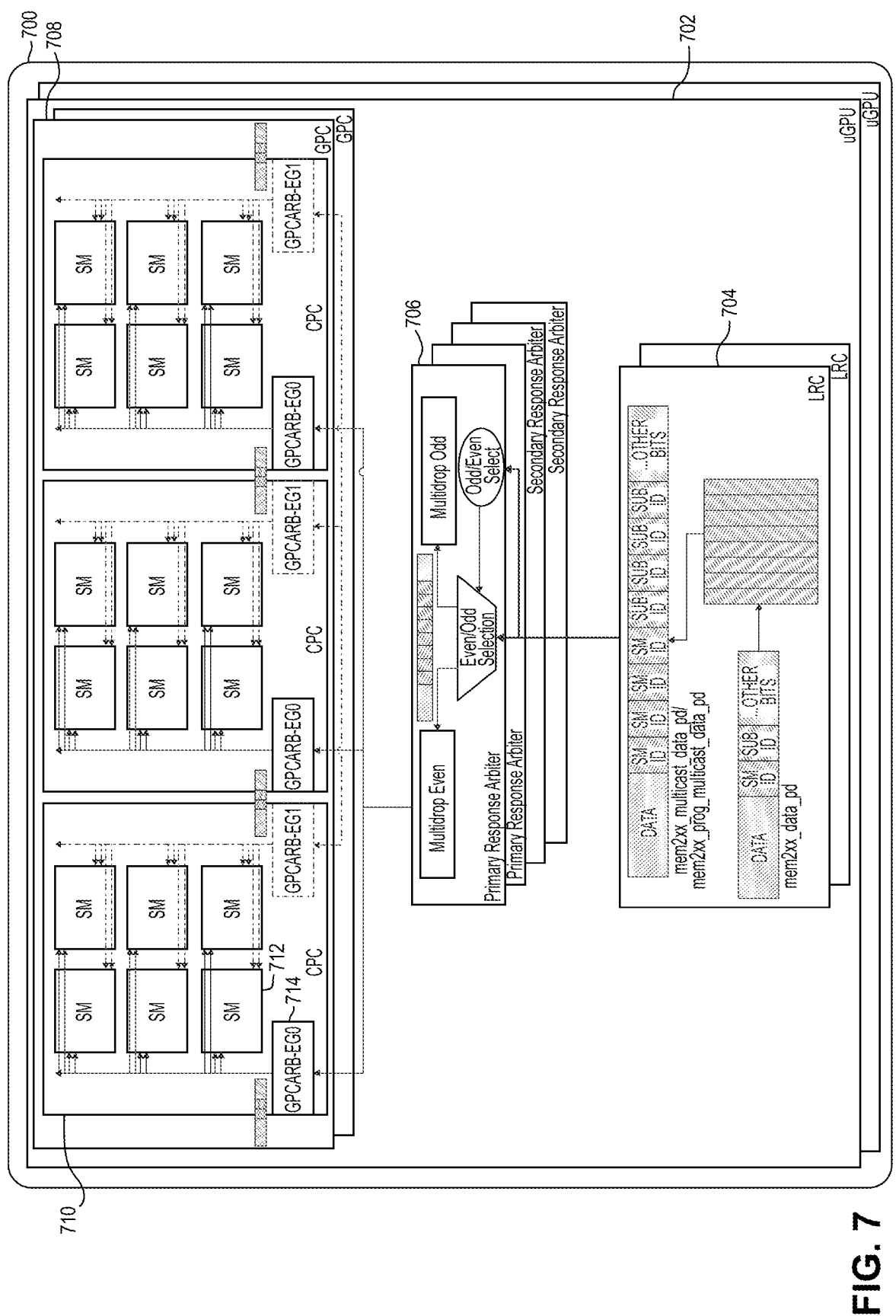
FIG. 7 shows example system elements, in particular a crossbar switch and general processing cluster (GPC) connected to LRC by the crossbar, participating in the multicast message flow according to some embodiments.

FIG. 7 illustrates the system components shown in FIG. 2A in more detail, according to an embodiment. According to some embodiments, the LRC 704 corresponds to LRC 212, crossbar 706 corresponds crossbar 208-210, and GPC 708 corresponds to GPC 202. The GPU 700 includes two micro-GPUs 702. Each micro-GPU 702 includes a plurality of LRCs 704. Each LRC 704 communicates with one L2 slice (not shown).

Eight slices are connected to each crossbar switch 706, which is a switch network from LRC, or more specifically 6 frame buffer partitions (FBPs) where each FBP has 8 slices with 2 ports per slice, to SMs. Crossbar switch 706 comprises six primary switches and six secondary switches. Each switch may be constructed as two separate switching networks by, for example, having one switching network for packets with an odd-numbered CPC ID, and a second switching network for packets with an even-numbered CPC ID. The switching network on which a packet from the LRC is to be sent is selected based on the CPC ID of that packet. The outputs of each of these can be multidropped to each of the arbiters on each Compute Processing Cluster (CPC).

GPU 700 includes multiple GPC 708, with each GPC having multiple CPC 710 and each CPC having multiple SMs 712. A CPC is a set of TPCs in the GPC that are optimized together in the physical design of the GPC. The 6 primary and 6 secondary switches from the LRC 704, each with 8 L2 slices coming in, feed into GPC. Each CPC includes two arbiters, each having 4 ports to yield 24 ports of input to each GPC. The memory requests are handled in L2's new coalescing unit. Once a read/load is forwarded to the L2 itself, and the LRC is responsible for holding the list (e.g. in the form of a bitmask) of multicast destinations and auxiliary data (such as, e.g., ZFILL, destination offsets) during the time that the L2 does the read, and then attaching the saved auxiliary data to the response produced by L2.

Figure 8:
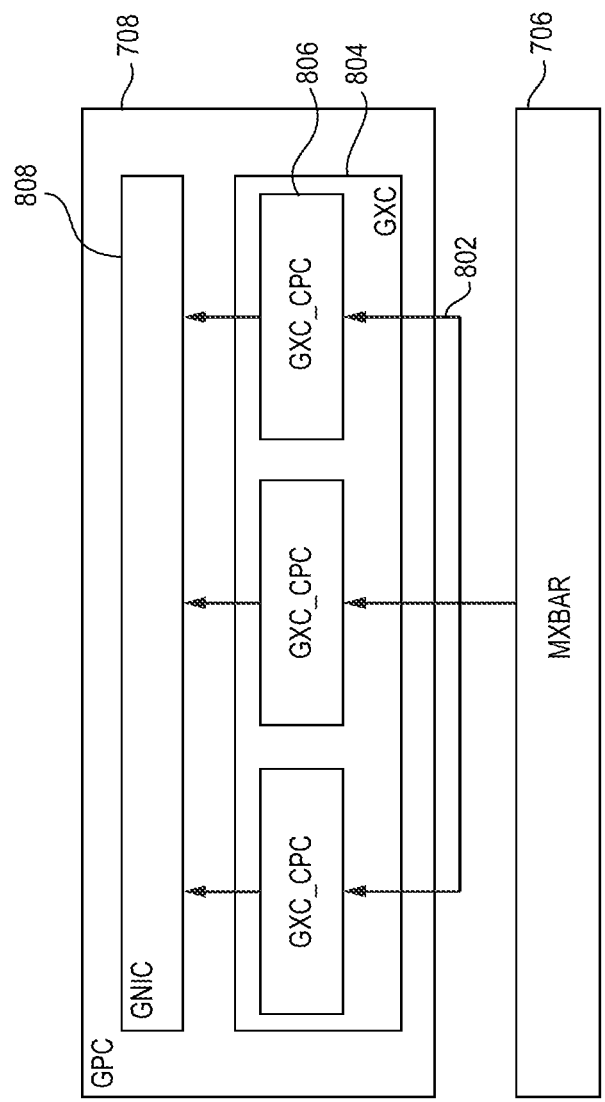
FIG. 8 shows example connectivity to the GPC in more detail in a system such as that in FIG. 7 according to some embodiments.

An example multidrop is more clearly seen in FIG. 8. Any packet multidropped on connection 802 by crossbar 706 will be received by all GXC_CPCs, and the embodiments may rely on each GXC_CPCs to check if its cpc_id bit is set in the cpc_id_bitmask of the incoming packet. If the cpc_id bit is set, the GXC will forward the packet to it respective GNIC/GPCARB (GPC arbiter) 714 or else it will drop that packet. Packets from any of the ports (in this example, 24 ports) of the crossbar 706 is put on the single wire 802, with each packet having the ID of each CPC on which a destination SM resides. Before a packet is received in the GNIC 808, it is received at all GXC_CPC 806 in the GXC 804 receive the packet and each GXC_CPC checks the CPC ID of the packet and processes the packet only of the CPC ID of the packet and that of the CPC match. Only the packets that match the ID of the corresponding CPC will be forwarded to the GPCARB-EG 714 via interface 808.

When a packet arrives at the GPC 708 and is filtered to a target CPC 710, it arrives at one of two GPC arbiters 714 hosted on the CPC 710. Each arbiter 714 is capable of sending to any SM 712 on that CPC. The arbiter may implement a scheme to control the flow of responses to each SM on the same CPC.

Figure 9A:
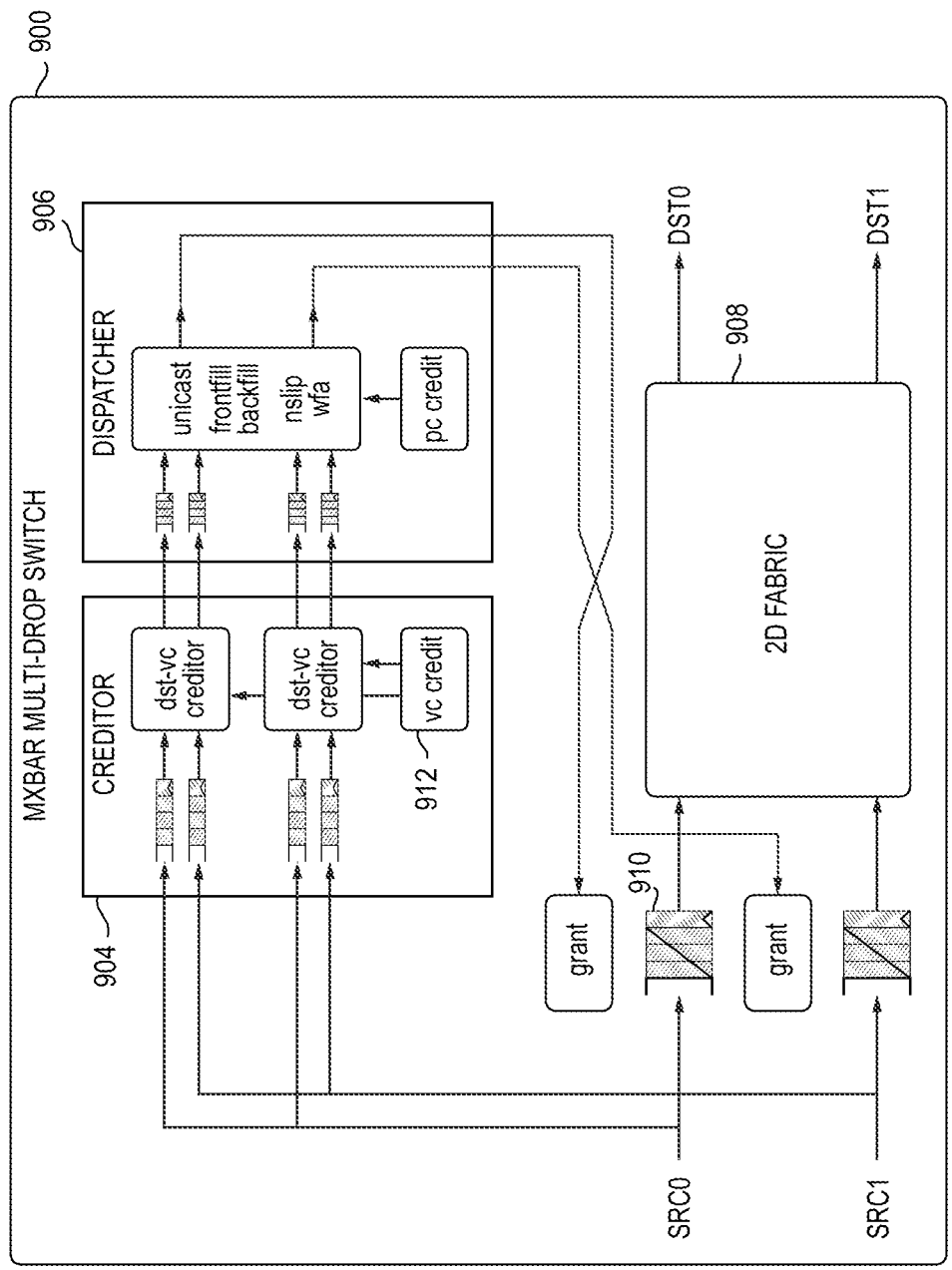
FIG. 9A shows an example multidrop switch between a crossbar and GPCs, according to some embodiments.

FIG. 9A illustrates an example crossbar multidrop switch 900, such as, for example, crossbar switch 706 shown in FIG. 7, that will select the Odd/Even multidrop sub-network based on a relevant round-robin pointer and schedule the entire corresponding transaction on that given selected sub-network.

The crossbar switch 900 will only consume credits for ports to CPCs that have the destination SMs. Moreover, a multidrop packet will only be credited as a whole, as in if all its destinations have credits available. Even if one of the destinations does not have credits, the given packet will get stalled.

After the multidrop subnetwork is selected, incoming packets from the L2 slice are held in an input queue 910 and the credit acquiring for transmission of that packet is performed. For multicast packets, the creditor 904 is configured to obtain credits for each destination of the multicast packet. The creditor 904 for example determines the number of CPCs to which the packet is to be multicast and, together with vc credit logic 912, obtains credits for each CPC to which the packet is directed.

The dispatcher 906 performs front fill, back fill, and according to an algorithm, such as NSLIP or wavefront alignment algorithm (WFA), for packets for which the credits have been acquired, and signals a grant or no grant. If a signal of grant of requested credit is received, the packet is transmitted through switch fabric 908 to the selected destination CPCs.

Figure 9B:
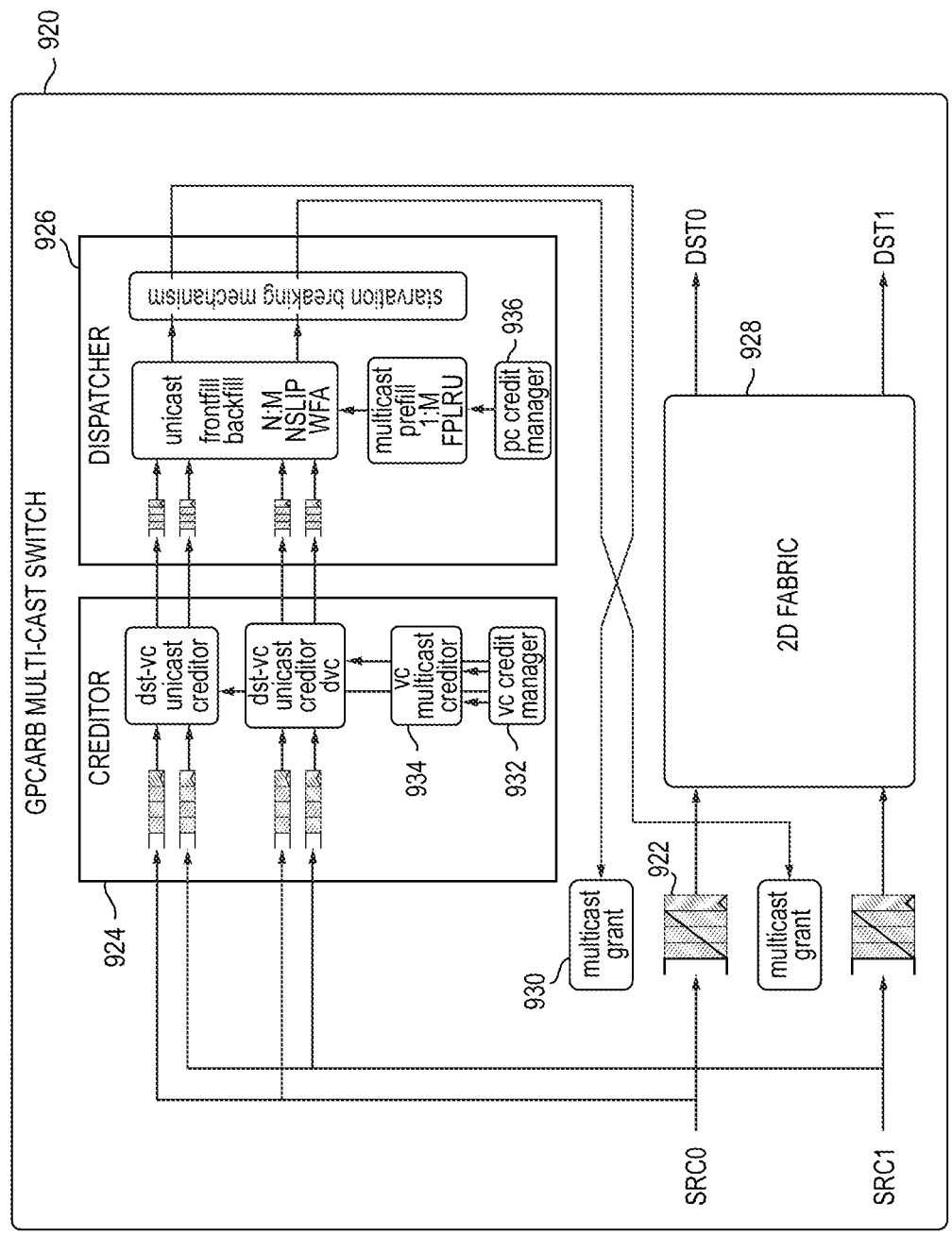
FIG. 9B shows an example multidrop switch between a GPCARB and the SMs, according to some embodiments.

FIG. 9B illustrates an example GPCARB multicast switch 920 according to some embodiments. A switch 920 may be included in each GPC arbiter 714 described in relation to FIG. 7 to receive a multi-dropped packet from the crossbar and to multicast it to the destination SMs residing in that CPC.

Packets from the crossbar 706 arrive at the input of the switch 920 and are held in an input queue 922, and the credit acquiring occurs in creditor 924. As shown, within creditor 924, the credits for unicast and multicast are implemented separately. A multicast creditor 934 operates first followed by the unicast creditors. Since the multicast creditor 934 cannot obtain a credit unless all receivers have available credits, giving priority to the multicast creditor 934 may result in improved multicast packet throughput. A credit manager 932 may be configured to prioritize the multicast creditor 934 over the unicast creditors in allocating credits to unicast and multicast. The multicast creditor 934 obtains credits sources for each destination SM before the packet is sent.

After the credits are obtained, the dispatcher 926 allocates non-conflicting sources using a cascaded least recently used arbiter or another scheduling technique. In some embodiments, starvation avoidance mechanisms may be implemented to enforce bandwidth/transaction fairness.

The GPC arbiter switch may include separate threads for multicast packets. For example, one thread may be included per source virtual channel. When crediting, a multicast packet would only get credited if all its destinations have credits available.

Multicast arbitration may take place in the prefill stage. A technique such as a least recently used (LRU) fixed priority multicast arbitration may be utilized. After multicast packets are included in a frame, the left-over holes may be filled with unicast requests in the frontfill and the backfill stages. These multicast packets would be sent until the conflict resolution arbiter after the GPC arbiter de-multiplexer, at which point it would be converted into unicast packets before they are received by the destined SMs.

Example GPU Architecture

An example illustrative architecture in which the programmatic multicast disclosed in this application is incorporated will now be described. The following information is set forth for illustrative purposes and should not be construed as limiting in any manner. Any of the following features may be optionally incorporated with or without the exclusion of other features described.

Figure 10:
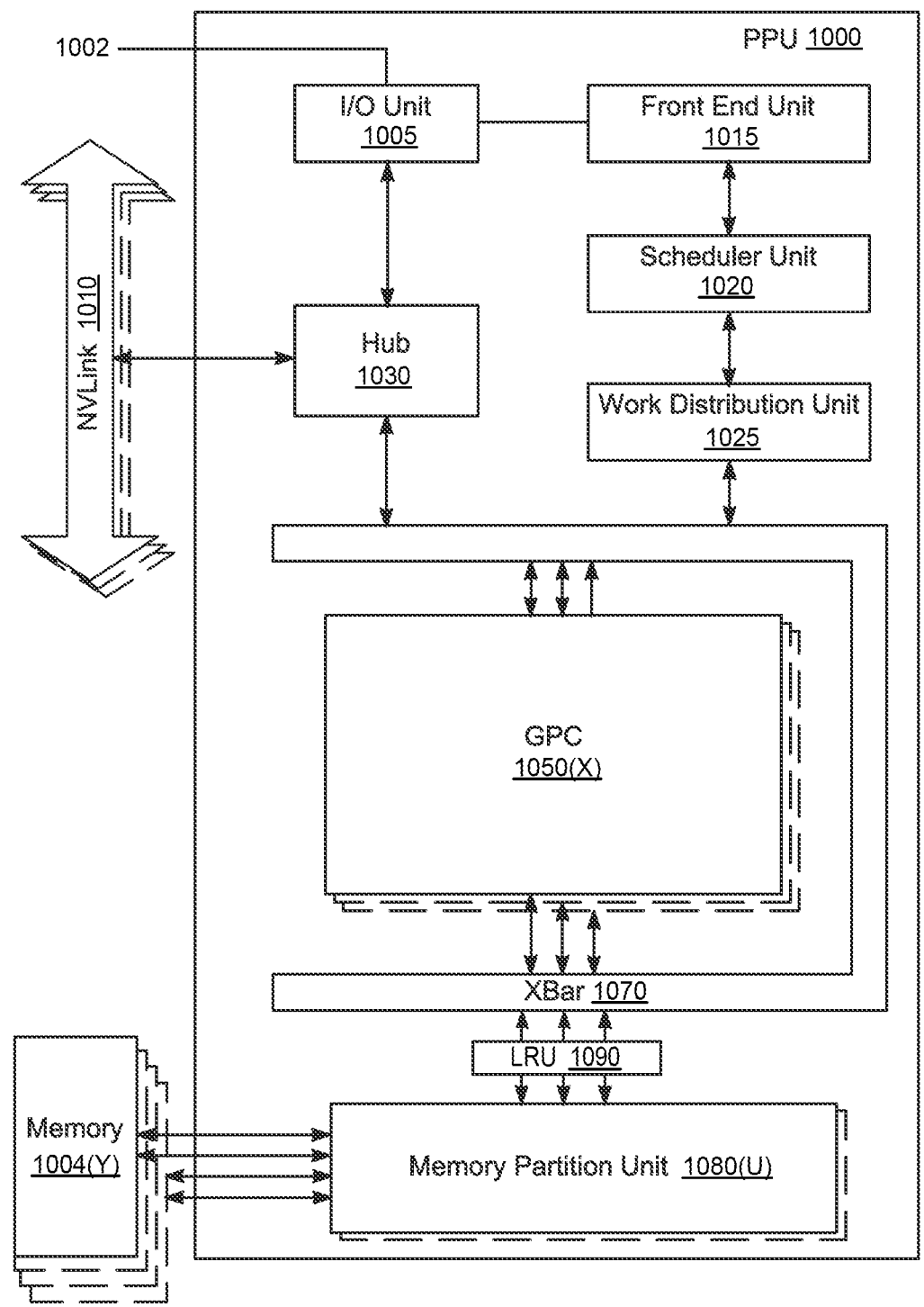
FIG. 10 illustrates an example parallel processing unit of a GPU, according to some embodiments.

FIG. 10 illustrates a parallel processing unit (PPU) 1000, in accordance with an embodiment. In an embodiment, the PPU 1000 is a multi-threaded processor that is implemented on one or more integrated circuit devices. The PPU 1000 is a latency hiding architecture designed to process many threads in parallel. A thread (e.g., a thread of execution) is an instantiation of a set of instructions configured to be executed by the PPU 1000. In an embodiment, the PPU 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1000 may be utilized for performing general-purpose computations. In some other embodiments, PPU 100 configured to implement large neural networks in deep learning applications or other high performance computing applications.

One or more PPUs 1000 may be configured to accelerate thousands of High Performance Computing (HPC), data center, and machine learning applications. The PPU 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the PPU 1000 includes an Input/Output (I/O) unit 1005, a front end unit 1015, a scheduler unit 1020, a work distribution unit 1025, a hub 1030, a crossbar (Xbar) 1070, one or more general processing clusters (GPCs) 1050, and one or more partition units 1080. An LRC 1080, such as, for example, described above in relation to FIGS. 2 and 2A, may be located between crossbar 1070 and the MPU 1080, and may be configured to support the multicast described above. The PPU 1000 may be connected to a host processor or other PPUs 1000 via one or more high-speed NVLink 1010 interconnect. The PPU 1000 may be connected to a host processor or other peripheral devices via an interconnect 1002. The PPU 1000 may also be connected to a memory comprising a number of memory devices 1004. In an embodiment, the memory 1004 may comprise a number of dynamic random access memory (DRAM) devices. The DRAM devices may be configured as a high-bandwidth memory (HBM) subsystem, with multiple DRAM dies stacked within each device.

The NVLink 1010 interconnect enables systems to scale and include one or more PPUs 1000 combined with one or more CPUs, supports cache coherence between the PPUs 1000 and CPUs, and CPU mastering. Data and/or commands may be transmitted by the NVLink 1010 through the hub 1030 to/from other units of the PPU 1000 such as one or more copy engines, a video encoder, a video decoder, a power management unit, etc. (not explicitly shown). The NVLink 1010 is described in more detail in conjunction with FIG. 13A and FIG. 13B.

The I/O unit 1005 is configured to transmit and receive communications (e.g., commands, data, etc.) from a host processor (not shown) over the interconnect 1002. The I/O unit 1005 may communicate with the host processor directly via the interconnect 1002 or through one or more intermediate devices such as a memory bridge. In an embodiment, the I/O unit 1005 may communicate with one or more other processors, such as one or more of the PPUs 1000 via the interconnect 1002. In an embodiment, the I/O unit 1005 implements a Peripheral Component Interconnect Express (PCIe) interface for communications over a PCIe bus and the interconnect 1002 is a PCIe bus. In alternative embodiments, the I/O unit 1005 may implement other types of well-known interfaces for communicating with external devices.

The I/O unit 1005 decodes packets received via the interconnect 1002. In an embodiment, the packets represent commands configured to cause the PPU 1000 to perform various operations. The I/O unit 1005 transmits the decoded commands to various other units of the PPU 1000 as the commands may specify. For example, some commands may be transmitted to the front end unit 1015. Other commands may be transmitted to the hub 1030 or other units of the PPU 1000 such as one or more copy engines, a video encoder, a video decoder, a power management unit, etc. (not explicitly shown). In other words, the I/O unit 1005 is configured to route communications between and among the various logical units of the PPU 1000.

In an embodiment, a program executed by the host processor encodes a command stream in a buffer that provides workloads to the PPU 1000 for processing. A workload may comprise several instructions and data to be processed by those instructions. The buffer is a region in a memory that is accessible (e.g., read/write) by both the host processor and the PPU 1000. For example, the I/O unit 1005 may be configured to access the buffer in a system memory connected to the interconnect 1002 via memory requests transmitted over the interconnect 1002. In an embodiment, the host processor writes the command stream to the buffer and then transmits a pointer to the start of the command stream to the PPU 1000. The front end unit 1015 receives pointers to one or more command streams. The front end unit 1015 manages the one or more streams, reading commands from the streams and forwarding commands to the various units of the PPU 1000.

The front end unit 1015 is coupled to a scheduler unit 1020 that configures the various GPCs 1050 to process tasks defined by the one or more streams. The scheduler unit 1020 is configured to track state information related to the various tasks managed by the scheduler unit 1020. The state may indicate which GPC 1050 a task is assigned to, whether the task is active or inactive, a priority level associated with the task, and so forth. The scheduler unit 1020 manages the execution of a plurality of tasks on the one or more GPCs 1050.

The scheduler unit 1020 is coupled to a work distribution unit 1025 that is configured to dispatch tasks for execution on the GPCs 1050. The work distribution unit 1025 may track a number of scheduled tasks received from the scheduler unit 1020. In an embodiment, the work distribution unit 1025 manages a pending task pool and an active task pool for each of the GPCs 1050. The pending task pool may comprise a number of slots (e.g., 32 slots) that contain tasks assigned to be processed by a particular GPC 1050. The active task pool may comprise a number of slots (e.g., 4 slots) for tasks that are actively being processed by the GPCs 1050. As a GPC 1050 finishes the execution of a task, that task is evicted from the active task pool for the GPC 1050 and one of the other tasks from the pending task pool is selected and scheduled for execution on the GPC 1050. If an active task has been idle on the GPC 1050, such as while waiting for a data dependency to be resolved, then the active task may be evicted from the GPC 1050 and returned to the pending task pool while another task in the pending task pool is selected and scheduled for execution on the GPC 1050.

The work distribution unit 1025 communicates with the one or more GPCs 1050 via XBar 1070. The XBar 1070 is an interconnect network that couples many of the units of the PPU 1000 to other units of the PPU 1000. For example, the XBar 1070 may be configured to couple the work distribution unit 1025 to a particular GPC 1050. Although not shown explicitly, one or more other units of the PPU 1000 may also be connected to the XBar 1070 via the hub 1030.

The tasks are managed by the scheduler unit 1020 and dispatched to a GPC 1050 by the work distribution unit 1025. The GPC 1050 is configured to process the task and generate results. The results may be consumed by other tasks within the GPC 1050, routed to a different GPC 1050 via the XBar 1070, or stored in the memory 1004. The results can be written to the memory 1004 via the partition units 1080, which implement a memory interface for reading and writing data to/from the memory 1004. The results can be transmitted to another PPU 1004 or CPU via the NVLink 1010. In an embodiment, the PPU 1000 includes a number U of partition units 1080 that is equal to the number of separate and distinct memory devices 1004 coupled to the PPU 1000. A partition unit 1080 will be described in more detail below in conjunction with FIG. 11B.

In an embodiment, a host processor executes a driver kernel that implements an application programming interface (API) that enables one or more applications executing on the host processor to schedule operations for execution on the PPU 1000. In an embodiment, multiple compute applications are simultaneously executed by the PPU 1000 and the PPU 1000 provides isolation, quality of service (QoS), and independent address spaces for the multiple compute applications. An application may generate instructions (e.g., API calls) that cause the driver kernel to generate one or more tasks for execution by the PPU 1000. The driver kernel outputs tasks to one or more streams being processed by the PPU 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads, cooperating threads and a hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

Figure 11A:
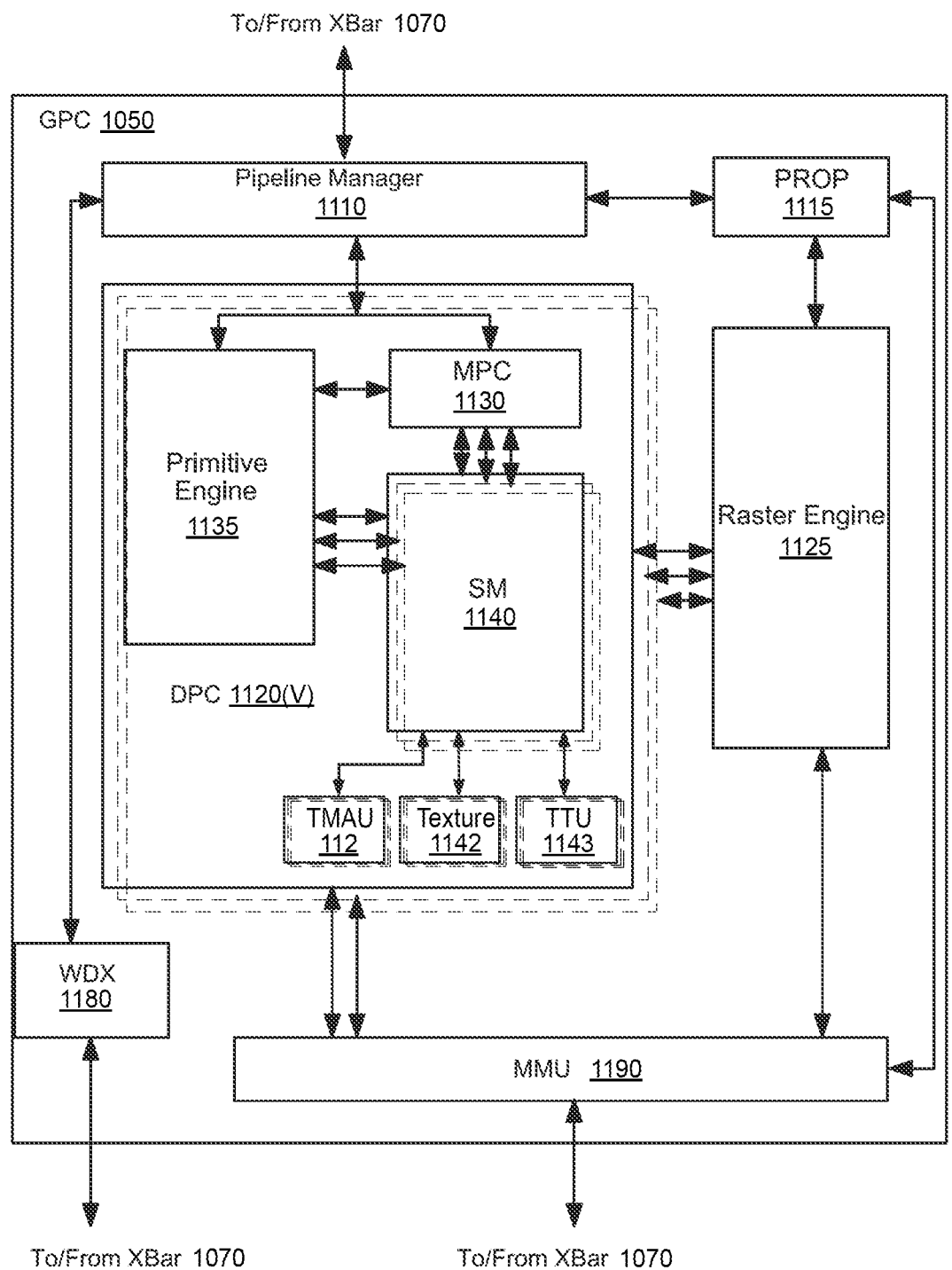
FIG. 11A illustrates an example general processing cluster (GPC) within the parallel processing unit of FIG. 10 with each streaming multiprocessor in the general processing cluster being coupled to a tensor memory access unit, according to some embodiments.

FIG. 11A illustrates a GPC 1050 of the PPU 1000 of FIG. 10, in accordance with an embodiment. As shown in FIG. 11A, each GPC 1050 includes a number of hardware units for processing tasks. In an embodiment, each GPC 1050 includes a pipeline manager 1110, a pre-raster operations unit (PROP) 1115, a raster engine 1125, a work distribution crossbar (WDX) 1180, a memory management unit (MMU) 1190, and one or more Data Processing Clusters (DPCs) 1120. It will be appreciated that the GPC 1050 of FIG. 11A may include other hardware units in lieu of or in addition to the units shown in FIG. 11A.

In an embodiment, the operation of the GPC 1050 is controlled by the pipeline manager 1110. The pipeline manager 1110 manages the configuration of the one or more DPCs 1120 for processing tasks allocated to the GPC 1050. In an embodiment, the pipeline manager 1110 may configure at least one of the one or more DPCs 1120 to implement at least a portion of a graphics rendering pipeline, a neural network, and/or a compute pipeline. For example, with respect to a graphics rendering pipeline, a DPC 1120 may be configured to execute a vertex shader program on the programmable streaming multiprocessor (SM) 1140. The pipeline manager 1110 may also be configured to route packets received from the work distribution unit 1025 to the appropriate logical units within the GPC 1050. For example, some packets may be routed to fixed function hardware units in the PROP 1115 and/or raster engine 1125 while other packets may be routed to the DPCs 1120 for processing by the primitive engine 1135 or the SM 1140.

Figure 11B:
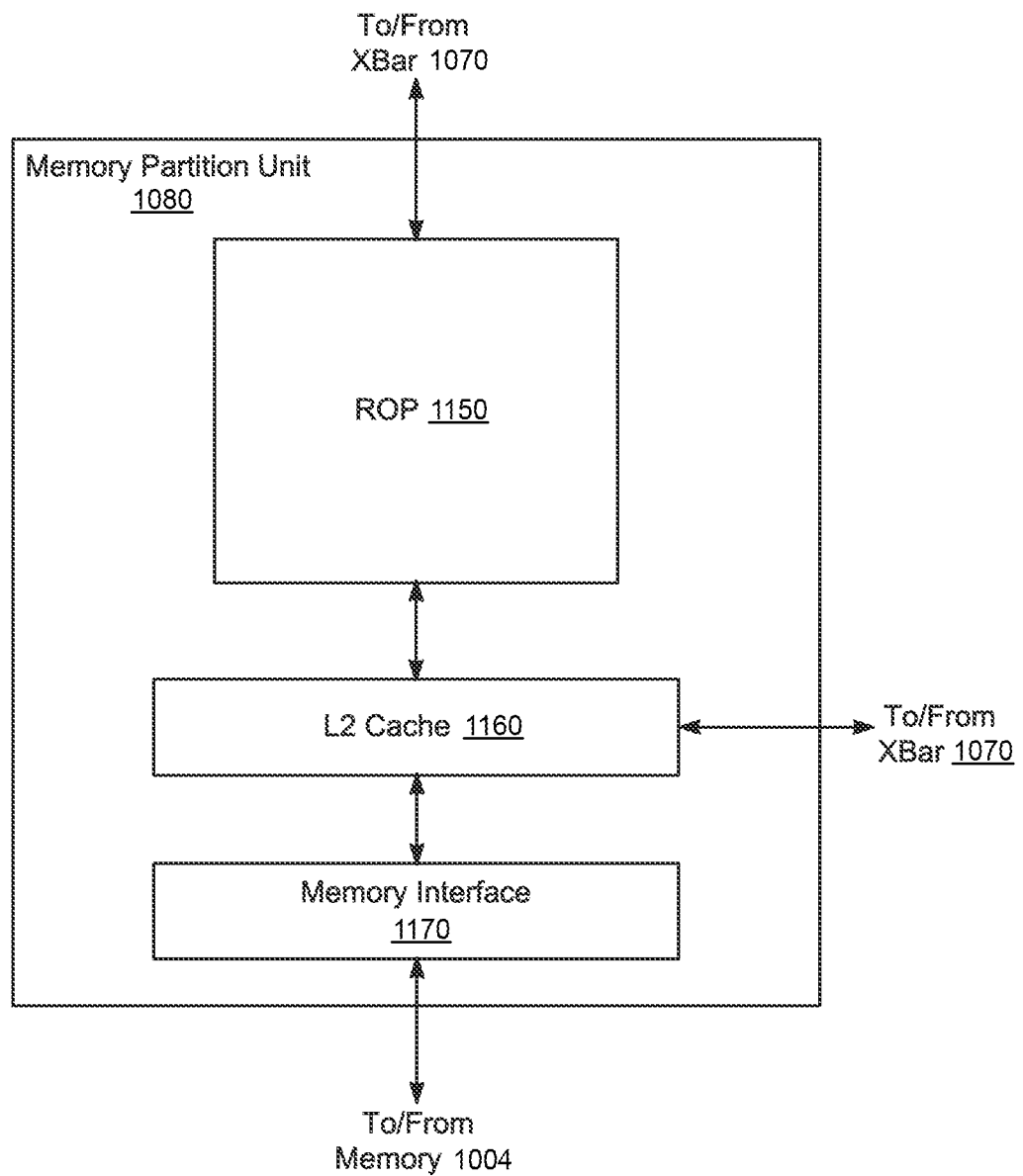
FIG. 11B illustrates an example memory partition unit of the parallel processing unit of FIG. 10.

The PROP unit 1115 is configured to route data generated by the raster engine 1125 and the DPCs 1120 to a Raster Operations (ROP) unit, described in more detail in conjunction with FIG. 11B. The PROP unit 1115 may also be configured to perform optimizations for color blending, organize pixel data, perform address translations, and the like.

Each DPC 1120 included in the GPC 1050 includes an M-Pipe Controller (MPC) 1130, a primitive engine 1135, and one or more SMs 1140. The MPC 1130 controls the operation of the DPC 1120, routing packets received from the pipeline manager 1110 to the appropriate units in the DPC 1120. For example, packets associated with a vertex may be routed to the primitive engine 1135, which is configured to fetch vertex attributes associated with the vertex from the memory 1004. In contrast, packets associated with a shader program may be transmitted to the SM 1140.

The SM 1140 comprises a programmable streaming processor that is configured to process tasks represented by a number of threads. Each SM 1140 is multi-threaded and configured to execute a plurality of threads (e.g., 32 threads) from a particular group of threads concurrently. In an embodiment, the SM 1140 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1140 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1140 is described in more detail below in conjunction with FIG. 12A.

The MMU 1190 provides an interface between the GPC 1050 and the partition unit 1080. The MMU 1190 may provide translation of virtual addresses into physical addresses, memory protection, and arbitration of memory requests. In an embodiment, the MMU 1190 provides one or more translation lookaside buffers (TLBs) for performing translation of virtual addresses into physical addresses in the memory 1004.

FIG. 11B illustrates a memory partition unit 1080 of the PPU 1000 of FIG. 10 in accordance with an embodiment. As shown in FIG. 11B, the memory partition unit 1080 includes a Raster Operations (ROP) unit 1150, a level two (L2) cache 1160, and a memory interface 1170. The memory interface 1170 is coupled to the memory 1004. Memory interface 1170 may implement 32, 64, 128, 1024-bit data buses, or the like, for high-speed data transfer. In an embodiment, the PPU 1000 incorporates U memory interfaces 1170, one memory interface 1170 per pair of partition units 1080, where each pair of partition units 1080 is connected to a corresponding memory device 1004. For example, PPU 1000 may be connected to up to Y memory devices 1004, such as high bandwidth memory stacks or graphics double-data-rate, version 5, synchronous dynamic random access memory, or other types of persistent storage.

In an embodiment, the memory interface 1170 implements an HBM2 memory interface and Y equals half U. In an embodiment, the HBM2 memory stacks are located on the same physical package as the PPU 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1004 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1000 process very large datasets and/or run applications for extended periods.

In an embodiment, the PPU 1000 implements a multi-level memory hierarchy. In an embodiment, the memory partition unit 1080 supports a unified memory to provide a single unified virtual address space for CPU and PPU 300 memory, enabling data sharing between virtual memory systems. In an embodiment the frequency of accesses by a PPU 1000 to memory located on other processors is traced to ensure that memory pages are moved to the physical memory of the PPU 1000 that is accessing the pages more frequently. In an embodiment, the NVLink 1010 supports address translation services allowing the PPU 1000 to directly access a CPU's page tables and providing full access to CPU memory by the PPU 1000.

In an embodiment, copy engines transfer data between multiple PPUs 1000 or between PPUs 1000 and CPUs. The copy engines can generate page faults for addresses that are not mapped into the page tables. The memory partition unit 1080 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1004 or other system memory may be fetched by the memory partition unit 1080 and stored in the L2 cache 1160, which is located on-chip and is shared between the various GPCs 1050. As shown, each memory partition unit 1080 includes a portion of the L2 cache 1160 associated with a corresponding memory device 1004. Lower level caches may then be implemented in various units within the GPCs 1050. For example, each of the SMs 1140 may implement a level one (L1) cache. The L1 cache is private memory that is dedicated to a particular SM 1140. Data from the L2 cache 1160 may be fetched and stored in each of the L1 caches for processing in the functional units of the SMs 1140. The L2 cache 1160 is coupled to the memory interface 1170 and the XBar 1070.

The ROP unit 1150 performs graphics raster operations related to pixel color, such as color compression, pixel blending, and the like. The ROP unit 450 also implements depth testing in conjunction with the raster engine 1125, receiving a depth for a sample location associated with a pixel fragment from the culling engine of the raster engine 1125. The depth is tested against a corresponding depth in a depth buffer for a sample location associated with the fragment. If the fragment passes the depth test for the sample location, then the ROP unit 1150 updates the depth buffer and transmits a result of the depth test to the raster engine 1125. It will be appreciated that the number of partition units 1080 may be different than the number of GPCs 1050 and, therefore, each ROP unit 1150 may be coupled to each of the GPCs 1050. The ROP unit 1150 tracks packets received from the different GPCs 1050 and determines which GPC 1050 that a result generated by the ROP unit 1150 is routed to through the Xbar 1070. Although the ROP unit 1150 is included within the memory partition unit 1080 in FIG. 11B, in other embodiment, the ROP unit 1150 may be outside of the memory partition unit 1080. For example, the ROP unit 1150 may reside in the GPC 1050 or another unit.

Figure 12:
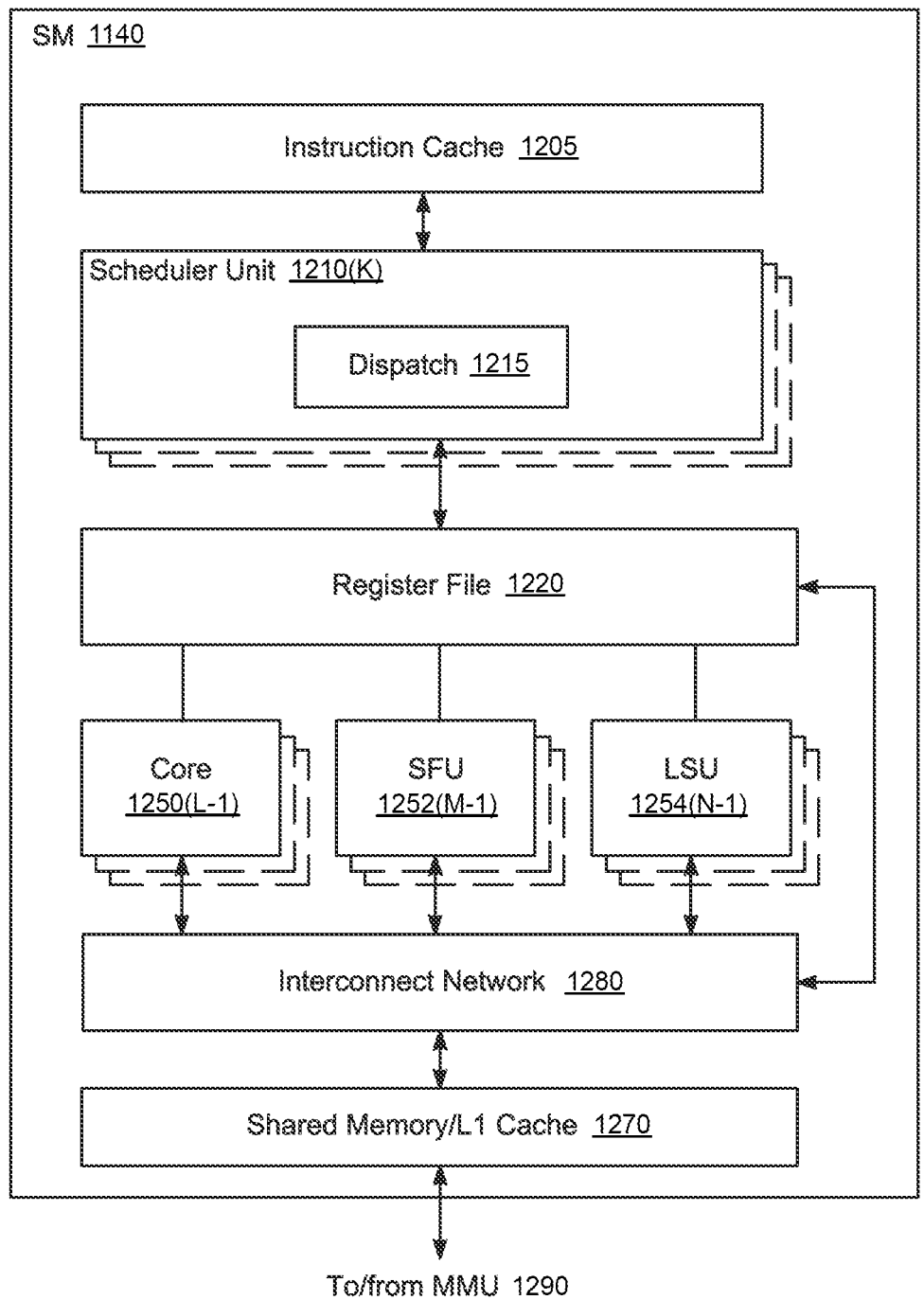
FIG. 12 illustrates an example streaming multiprocessor of FIG. 11A.

FIG. 12 illustrates the streaming multiprocessor 1140 of FIG. 11A, in accordance with an embodiment. As shown in FIG. 12, the SM 1140 includes an instruction cache 1205, one or more scheduler units 1210, a register file 1220, one or more processing cores 1250, one or more special function units (SFUs) 1252, one or more load/store units (LSUs) 1254, an interconnect network 1280, a shared memory/L1 cache 1270.

As described above, the work distribution unit 1025 dispatches tasks for execution on the GPCs 1050 of the PPU 1000. The tasks are allocated to a particular DPC 1120 within a GPC 1050 and, if the task is associated with a shader program, the task may be allocated to an SM 1140. The scheduler unit 1210 receives the tasks from the work distribution unit 1025 and manages instruction scheduling for one or more thread blocks assigned to the SM 1140. The scheduler unit 1210 schedules thread blocks for execution as warps of parallel threads, where each thread block is allocated at least one warp. In an embodiment, each warp executes 32 threads. The scheduler unit 1210 may manage a plurality of different thread blocks, allocating the warps to the different thread blocks and then dispatching instructions from the plurality of different cooperative groups to the various functional units (e.g., cores 1250, SFUs 1252, and LSUs 1254) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

A dispatch unit 1215 is configured to transmit instructions to one or more of the functional units. In the embodiment, the scheduler unit 1210 includes two dispatch units 1215 that enable two different instructions from the same warp to be dispatched during each clock cycle. In alternative embodiments, each scheduler unit 1210 may include a single dispatch unit 1215 or additional dispatch units 1215.

Each SM 1140 includes a register file 1220 that provides a set of registers for the functional units of the SM 1140. In an embodiment, the register file 1220 is divided between each of the functional units such that each functional unit is allocated a dedicated portion of the register file 1220. In another embodiment, the register file 1220 is divided between the different warps being executed by the SM 1140. The register file 1220 provides temporary storage for operands connected to the data paths of the functional units.

Each SM 1140 comprises multiple processing cores 1250. In an embodiment, the SM 1140 includes a large number (e.g., 128, etc.) of distinct processing cores 1250. Each core 1250 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1250 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1250. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 1250 or another functional unit (e.g., SFUs 1252 or LSUs 1254) and is configured to generate matrix data stored by diagonals and/or generate the original matrix and/or transposed matrix from the matrix data stored by diagonals. The transposition hardware may be provided inside of the shared memory 1270 to register file 1220 load path of the SM 1140.

In one example, the matrix data stored by diagonals may be fetched from DRAM and stored in the shared memory 1270. As the instruction to perform processing using the matrix data stored by diagonals is processed, transposition hardware disposed in the path of the shared memory 1270 and the register file 1220 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 1220.

Each SM 1140 also comprises multiple SFUs 1252 that perform special functions (e.g., attribute evaluation, reciprocal square root, and the like). In an embodiment, the SFUs 1252 may include a tree traversal unit (e.g., TTU 1143) configured to traverse a hierarchical tree data structure. In an embodiment, the SFUs 1252 may include texture unit (e.g., Texture Unit 1142) configured to perform texture map filtering operations. In an embodiment, the texture units are configured to load texture maps (e.g., a 2D array of texels) from the memory 1004 and sample the texture maps to produce sampled texture values for use in shader programs executed by the SM 1140. In an embodiment, the texture maps are stored in the shared memory/L1 cache 1170. The texture units implement texture operations such as filtering operations using mip-maps (e.g., texture maps of varying levels of detail). In an embodiment, each SM 1140 includes two texture units.

Each SM 1140 also comprises multiple LSUs 1254 that implement load and store operations between the shared memory/L1 cache 1270 and the register file 1220. Each SM 1140 includes an interconnect network 1280 that connects each of the functional units to the register file 1220 and the LSU 1254 to the register file 1220, shared memory/L1 cache 1270. In an embodiment, the interconnect network 1280 is a crossbar that can be configured to connect any of the functional units to any of the registers in the register file 1220 and connect the LSUs 1254 to the register file 1220 and memory locations in shared memory/L1 cache 1270.

The shared memory/L1 cache 1270 is an array of on-chip memory that allows for data storage and communication between the SM 1140 and the primitive engine 1135 and between threads in the SM 1140. In an embodiment, the shared memory/L1 cache 1270 comprises 128 KB of storage capacity and is in the path from the SM 1140 to the partition unit 1080. The shared memory/L1 cache 1270 can be used to cache reads and writes. One or more of the shared memory/L1 cache 1270, L2 cache 1160, and memory 1004 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1270 enables the shared memory/L1 cache 1270 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 11A, are bypassed, creating a much simpler programming model. In the general purpose parallel computation configuration, the work distribution unit 1025 assigns and distributes blocks of threads directly to the DPCs 1120. The threads in a block execute the same program, using a unique thread ID in the calculation to ensure each thread generates unique results, using the SM 1140 to execute the program and perform calculations, shared memory/L1 cache 1270 to communicate between threads, and the LSU 1254 to read and write global memory through the shared memory/L1 cache 1270 and the memory partition unit 1080. When configured for general purpose parallel computation, the SM 1140 can also write commands that the scheduler unit 1020 can use to launch new work on the DPCs 1120.

The PPU 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1000 is embodied on a single semiconductor substrate. In another embodiment, the PPU 1000 is included in a system-on-a-chip (SoC) along with one or more other devices such as additional PPUs 1000, the memory 1004, a reduced instruction set computer (RISC) CPU, a memory management unit (MMU), a digital-to-analog converter (DAC), and the like.

In an embodiment, the PPU 1000 may be included on a graphics card that includes one or more memory devices 1004. The graphics card may be configured to interface with a PCIe slot on a motherboard of a desktop computer. In yet another embodiment, the PPU 1000 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13A:
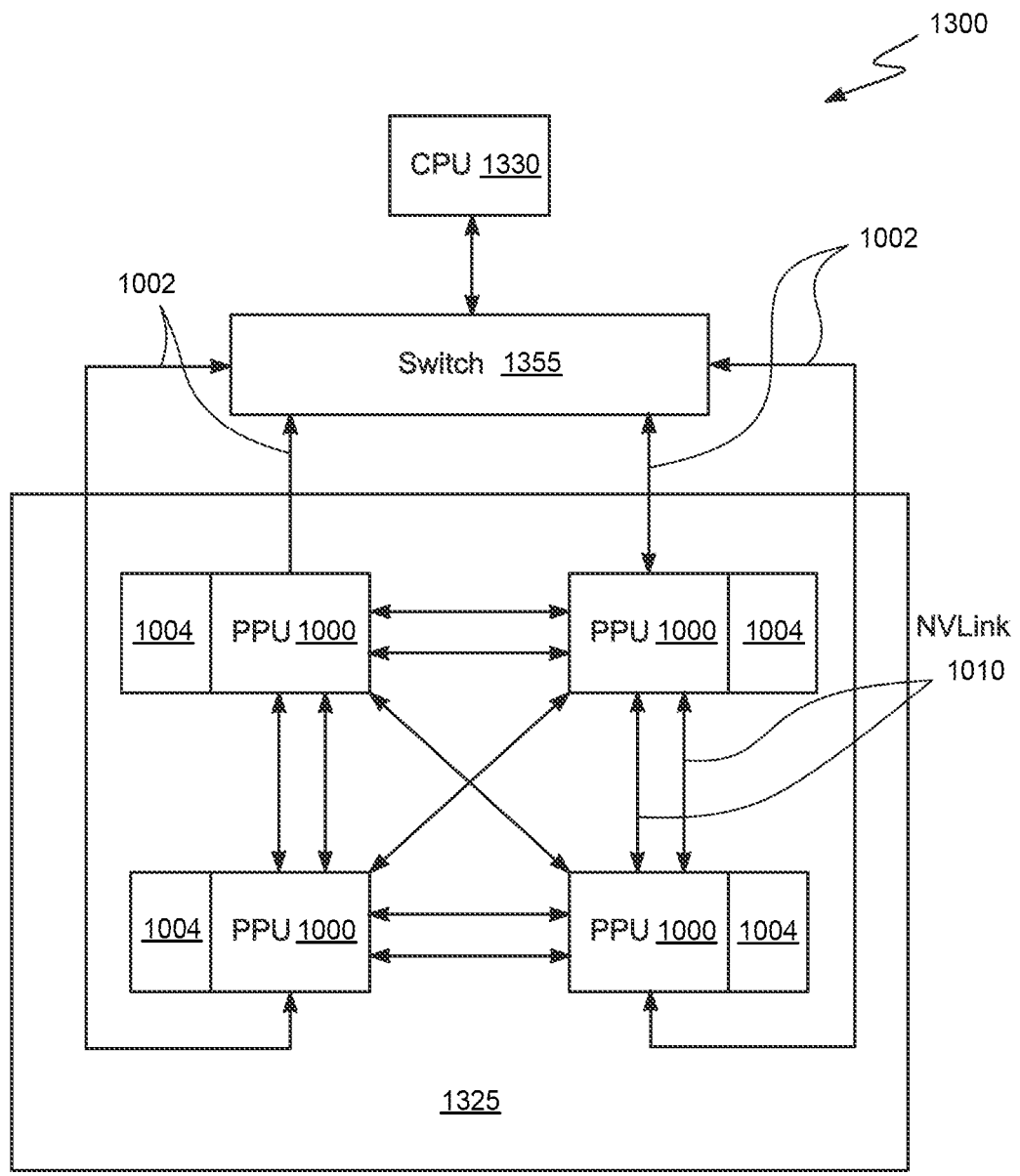
FIG. 13A is an example conceptual diagram of a processing system implemented using the parallel processing unit (PPU) of FIG. 10.

FIG. 13A is a conceptual diagram of a processing system 1300 implemented using the PPU 1000 of FIG. 10, in accordance with an embodiment. The exemplary system 1300 may be configured to implement the methods disclosed in this application (e.g., the TMAU in FIG. 1, 2, 6 or 11A). The processing system 1300 includes a CPU 1330, switch 1355, and multiple PPUs 1000 each and respective memories 1004. The NVLink 1010 provides high-speed communication links between each of the PPUs 1000. Although a particular number of NVLink 1010 and interconnect 1002 connections are illustrated in FIG. 13A, the number of connections to each PPU 1000 and the CPU 1330 may vary. The switch 1355 interfaces between the interconnect 1002 and the CPU 1330. The PPUs 1000, memories 1004, and NVLinks 1010 may be situated on a single semiconductor platform to form a parallel processing module 1325. In an embodiment, the switch 1355 supports two or more protocols to interface between various different connections and/or links.

In another embodiment (not shown), the NVLink 1010 provides one or more high-speed communication links between each of the PPUs 1000 and the CPU 1330 and the switch 1355 interfaces between the interconnect 1002 and each of the PPUs 1000. The PPUs 1000, memories 1004, and interconnect 1002 may be situated on a single semiconductor platform to form a parallel processing module 1325. In yet another embodiment (not shown), the interconnect 1002 provides one or more communication links between each of the PPUs 1000 and the CPU 1330 and the switch 1355 interfaces between each of the PPUs 1000 using the NVLink 1010 to provide one or more high-speed communication links between the PPUs 1000. In another embodiment (not shown), the NVLink 1010 provides one or more high-speed communication links between the PPUs 1000 and the CPU 1330 through the switch 1355. In yet another embodiment (not shown), the interconnect 1002 provides one or more communication links between each of the PPUs 1000 directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1325 may be implemented as a circuit board substrate and each of the PPUs 1000 and/or memories 1004 may be packaged devices. In an embodiment, the CPU 1330, switch 1355, and the parallel processing module 1325 are situated on a single semiconductor platform.

In an embodiment, the signaling rate of each NVLink 1010 is 20 to 25 Gigabits/second and each PPU 1000 includes six NVLink 1010 interfaces (as shown in FIG. 13A, five NVLink 1010 interfaces are included for each PPU 1000). Each NVLink 1010 provides a data transfer rate of 25 Gigabytes/second in each direction, with six links providing 1000 Gigabytes/second. The NVLinks 1010 can be used exclusively for PPU-to-PPU communication as shown in FIG. 13A, or some combination of PPU-to-PPU and PPU-to-CPU, when the CPU 1330 also includes one or more NVLink 1010 interfaces.

In an embodiment, the NVLink 1010 allows direct load/store/atomic access from the CPU 1330 to each PPU's 1000 memory 1004. In an embodiment, the NVLink 1010 supports coherency operations, allowing data read from the memories 1004 to be stored in the cache hierarchy of the CPU 1330, reducing cache access latency for the CPU 1330. In an embodiment, the NVLink 1010 includes support for Address Translation Services (ATS), allowing the PPU 1000 to directly access page tables within the CPU 1330. One or more of the NVLinks 1010 may also be configured to operate in a low-power mode.

Figure 13B:
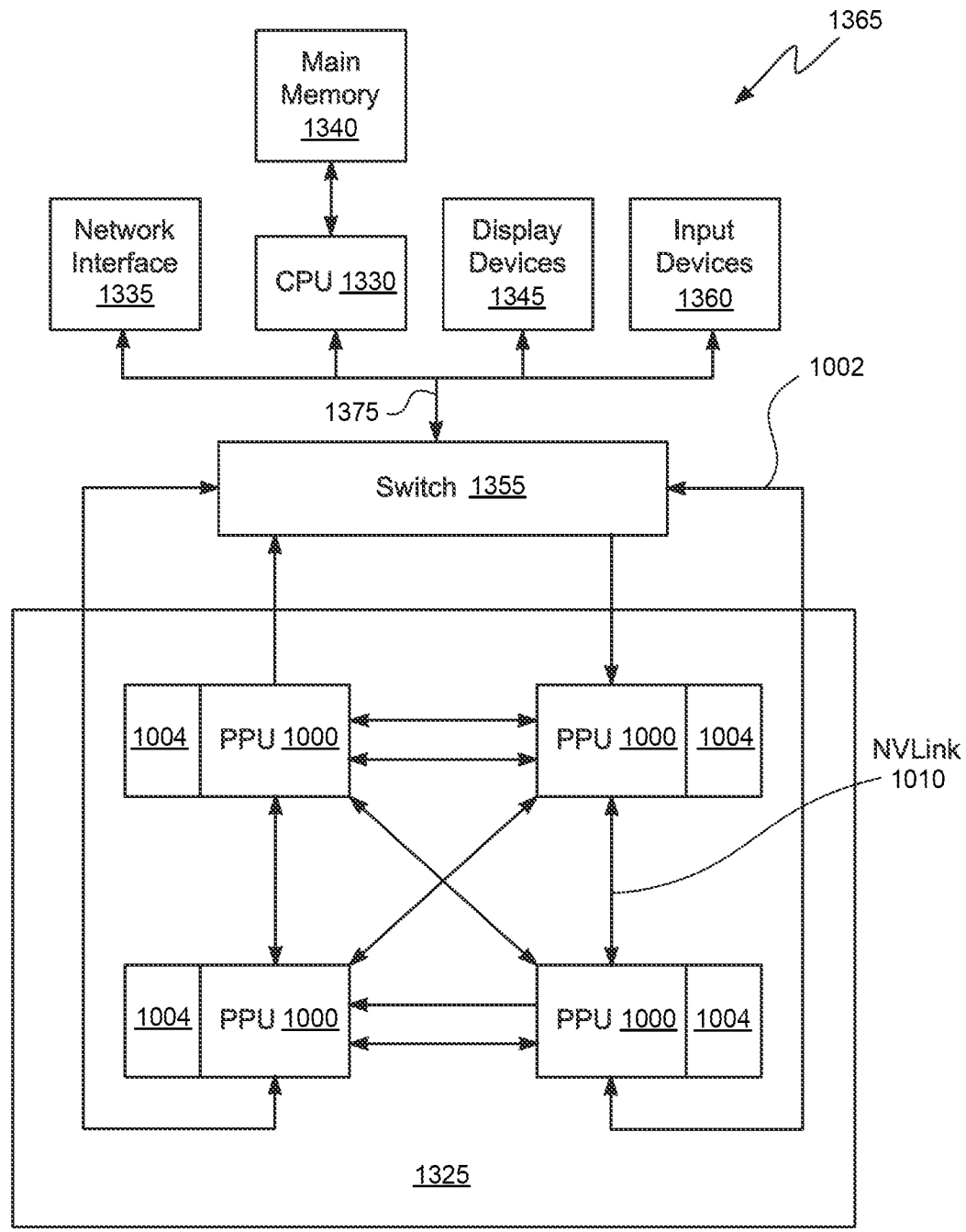
FIG. 13B is a block diagram of an exemplary system in which the various architecture and/or functionality of the various previous embodiments may be implemented.

FIG. 13B illustrates an exemplary system 1365 in which the various architecture and/or functionality of the various previous embodiments may be implemented. The exemplary system 1365 may be configured to implement the methods disclosed in this application (e.g., the TMAU in FIG. 1, 2, 6 or 11A).

As shown, a system 1365 is provided including at least one central processing unit 1330 that is connected to a communication bus 1375. The communication bus 1375 may be implemented using any suitable protocol, such as PCI (Peripheral Component Interconnect), PCI-Express, AGP (Accelerated Graphics Port), HyperTransport, or any other bus or point-to-point communication protocol(s). The system 1365 also includes a main memory 1340. Control logic (software) and data are stored in the main memory 1340 which may take the form of random access memory (RAM).

The system 1365 also includes input devices 1360, the parallel processing system 1325, and display devices 1345, e.g. a conventional CRT (cathode ray tube), LCD (liquid crystal display), LED (light emitting diode), plasma display or the like. User input may be received from the input devices 1360, e.g., keyboard, mouse, touchpad, microphone, and the like. Each of the foregoing modules and/or devices may even be situated on a single semiconductor platform to form the system 1365. Alternately, the various modules may also be situated separately or in various combinations of semiconductor platforms per the desires of the user.

Further, the system 1365 may be coupled to a network (e.g., a telecommunications network, local area network (LAN), wireless network, wide area network (WAN) such as the Internet, peer-to-peer network, cable network, or the like) through a network interface 1335 for communication purposes.

The system 1365 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1340 and/or the secondary storage. Such computer programs, when executed, enable the system 1365 to perform various functions. The memory 1340, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1365 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 1000. The API provides an abstraction for a programmer that lets a programmer utilize specialized graphics hardware, such as the PPU 1000, to generate the graphical data without requiring the programmer to utilize the specific instruction set for the PPU 1000. The application may include an API call that is routed to the device driver for the PPU 1000. The device driver interprets the API call and performs various operations to respond to the API call. In some instances, the device driver may perform operations by executing instructions on the CPU. In other instances, the device driver may perform operations, at least in part, by launching operations on the PPU 1000 utilizing an input/output interface between the CPU and the PPU 1000. In an embodiment, the device driver is configured to implement the graphics processing pipeline 1400 utilizing the hardware of the PPU 1000.

Various programs may be executed within the PPU 1000 in order to implement the various stages of the processing for the application program. For example, the device driver may launch a kernel on the PPU 1000 to perform one stage of processing on one SM 1140 (or multiple SMs 1140). The device driver (or the initial kernel executed by the PPU 1000) may also launch other kernels on the PPU 1000 to perform other stages of the processing. If the application program processing includes a graphics processing pipeline, then some of the stages of the graphics processing pipeline may be implemented on fixed unit hardware such as a rasterizer or a data assembler implemented within the PPU 1000. It will be appreciated that results from one kernel may be processed by one or more intervening fixed function hardware units before being processed by a subsequent kernel on an SM 1140.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A processing system comprising:
   a plurality of processors;
   a distributed shared memory comprising a plurality of distributed shared memory areas, wherein each processor of the plurality of processors is locally connected to a respective one of the plurality of distributed shared memory areas,
   wherein the plurality of processors are configured to simultaneously execute a plurality of threads, one of the threads executing on a first of the plurality of processors generating a memory access request for data for one or more other threads of the threads executing on one or more second ones of the plurality of processors; and
   packet distribution circuitry configured to route to each processor of the one or more second ones of the plurality of processors, for storage in the distributed shared memory locally connected to said each processor, a respective portion of response data received in response to the memory access request.

2. The processing system according to claim 1 further comprising a memory interface circuitry, wherein the memory interface circuitry is configured to transmit the memory access request to a memory hierarchy including a cache memory.

3. The processing system according to claim 1, wherein the packet distribution circuitry includes tracking circuitry and is further configured to, in response to receiving the memory access request, storing metadata from the memory access request in the tracking circuitry and generating a modified memory access request for the requested data, and, in response to receiving the response data, forming a multicast response packet including the metadata and transmitting the multicast response packet to at least the one or more second ones of said plurality of processors.

4. The processing system according to claim 3, wherein the stored metadata includes identifying information of the one or more other threads, and the modified memory access request is devoid of the identifying information of the one or more other threads.

5. The processing system according to claim 3, wherein the packet distribution circuitry further includes packet generation circuitry that, in response to receiving the multicast response packet, generates a first response packet and a second response packet each routed to a respective one of the plurality of processors.

6. The processing system according to claim 5, wherein the packet distribution circuitry is configured to transport the multicast response packet in a portion of the packet distribution circuitry before generating said first response packet and said second response packet.

7. The processing system according to claim 1, wherein the plurality of threads comprise a plurality of cooperative thread arrays (CTAs) launched as a cooperative group array (CGA), wherein a respective one of the CTAs is launched on each processor of the plurality of processors.

8. The processing system according to claim 1, wherein the memory access request comprises requester information, receiver information for each of a plurality of receivers, and requested data information.

9. The processing system according to claim 8, wherein the receiver information further includes, for each receiving cooperative thread arrays (CTA), a receiver identifier and an offset in the corresponding shared memory area.

10. The processing system according to claim 9, wherein the offset for each of the receiving CTAs is identical.

11. The processing system according to claim 9, wherein all receiver identifiers are specified in a list.

12. The processing system according to claim 9, wherein all receiver identifiers are specified in a bitmask.

13. The processing system according to claim 8, wherein the memory access request further comprises a synchronization barrier offset in the distributed shared memory.

14. The processing system according to claim 8, wherein the memory access request further comprises one or more operation to be performed by a receiver prior to or during writing the response data to the distributed shared memory area of the receiver.

15. The processing system according to claim 1, wherein at least one of the respective processors is configured to, in response to receiving multicast data, transmit an acknowledgment to another one of the processors.

16. The processing system according to claim 1, comprising a first set of counters and a second set of counters for each of the plurality of processors, the first set of counters at the first processor including a respective counter representing multicast data received from each of a plurality of other said processors, and the second set of counters at the first processor including a counter representing multicast data requested by the first processor on behalf of others of the plurality of processors.

17. The processing system according to claim 1, wherein the packet distribution circuitry comprises a plurality of crossbar switches, each crossbar switch connecting a cache portion to the plurality of processors.

18. The processing system according to claim 1, wherein the packet distribution circuitry is configured to select a crossbar switch for transporting a packet including the requested data based on a destination identifier of the packet.

19. The processing system according to claim 1, wherein the packet distribution circuitry is configured to write respective portions of the response data to the distributed shared memory of at least the one or more second ones of the plurality of processors.

20. The processing system according to claim 1, wherein the processing system comprises a graphics processing unit (GPU).

21. A system comprising at least one central processing unit (CPU) and at least one processing system according to claim 1.

* * * * *